(12) United States Patent
Yagi

(10) Patent No.: US 10,805,880 B2
(45) Date of Patent: Oct. 13, 2020

(54) COMMUNICATION DEVICE, COMMUNICATION METHOD, AND COMPUTER READABLE MEDIUM

(71) Applicant: MITSUBISHI ELECTRIC CORPORATION, Tokyo (JP)

(72) Inventor: Akiyoshi Yagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 59 days.

(21) Appl. No.: 16/315,586

(22) PCT Filed: Aug. 29, 2016

(86) PCT No.: PCT/JP2016/075223
§ 371 (c)(1),
(2) Date: Jan. 4, 2019

(87) PCT Pub. No.: WO2018/042496
PCT Pub. Date: Mar. 8, 2018

(65) Prior Publication Data
US 2019/0306796 A1 Oct. 3, 2019

(51) Int. Cl.
*H04W 52/02* (2009.01)
*H04W 56/00* (2009.01)
*H04W 84/18* (2009.01)

(52) U.S. Cl.
CPC ....... *H04W 52/0219* (2013.01); *H04W 52/02* (2013.01); *H04W 52/0216* (2013.01);
(Continued)

(58) Field of Classification Search
CPC ............ H04W 52/0219; H04W 52/02; H04W 52/0216; H04W 56/0015; H04W 84/18; Y02D 70/20
See application file for complete search history.

(56) References Cited

U.S. PATENT DOCUMENTS

2006/0282498 A1 12/2006 Muro
2009/0168747 A1 7/2009 Kimura
(Continued)

FOREIGN PATENT DOCUMENTS

JP 2006-344017 A 12/2006
JP 2007-5991 A 1/2007
(Continued)

OTHER PUBLICATIONS

International Search Report for PCT/JP2016/075223 (PCT/ISA/210) dated Oct. 25, 2016.
(Continued)

*Primary Examiner* — Melvin C Marcelo
(74) *Attorney, Agent, or Firm* — Birch, Stewart, Kolasch & Birch, LLP

(57) ABSTRACT

A master station device (1) switches a sleep state and an operation state in synchronization with a slave station device. A communication scenario management unit (28) manages a communication scenario in which one or more data communication procedures among a data communication procedure for data communication by polling, a data communication procedure for push data communication, a data communication procedure for participation in a communication network, and a data communication procedure for shift to a sleep state are described as an execution data communication procedure that is executed in the operation state and an execution order of the one or more execution data communication procedures is further described, and which is shared with the slave station device. A data communication procedure execution unit (101) executes the one or more execution data communication procedures described in the communication scenario with the slave station device in the execution order described in the com-
(Continued)

munication scenario, every time the sleep state is switched to the operation state.

18 Claims, 27 Drawing Sheets

(52) U.S. Cl.
CPC ........ *H04W 56/0015* (2013.01); *H04W 84/18* (2013.01); *Y02D 70/20* (2018.01)

(56) References Cited

U.S. PATENT DOCUMENTS

| | | | |
|---|---|---|---|
| 2013/0208622 A1 | 8/2013 | Ibuki | |
| 2015/0071211 A1* | 3/2015 | Seok | H04W 74/006 370/329 |
| 2015/0327265 A1* | 11/2015 | Lee | H04W 64/003 370/311 |
| 2017/0257872 A1* | 9/2017 | Lee | H04W 52/0203 |
| 2018/0167864 A1* | 6/2018 | Johnston | H04W 40/244 |
| 2020/0022216 A1* | 1/2020 | Huang | H04W 52/0216 |

FOREIGN PATENT DOCUMENTS

| | | |
|---|---|---|
| JP | 2009-206749 A | 9/2009 |
| JP | 2009-260734 A | 11/2009 |
| JP | 2010-193413 A | 9/2010 |
| JP | 2011-223419 A | 11/2011 |
| JP | 2012-49829 A | 3/2012 |
| JP | 2013-165309 A | 8/2013 |
| JP | 5426190 B2 | 2/2014 |
| WO | WO 2007/066637 A1 | 6/2007 |
| WO | WO 2011/154911 A1 | 12/2011 |

OTHER PUBLICATIONS

Kubo et al., "Electric Power Conservation Technology for Wireless Sensor Networks", Oki Technical Review, Apr. 2009/Issue 214 vol. 76 No. 1, pp. 32-35.

Office Action dated Apr. 17, 2018 for the corresponding Taiwanese application No. 105134394 with computer-generated English translation.

Office Action dated Jul. 4, 2017 for the corresponding Japanese application No. 2017-504119 with computer-generated English translation.

Office Action dated Mar. 14, 2017 for the corresponding Japanese application No. 2017-504119 with computer-generated English translation.

Office Action issued in corresponding German Application No. 11 2016 007 094.2 dated May 14, 2019.

\* cited by examiner

COMMUNICATION DEVICE, COMMUNICATION METHOD, AND COMPUTER READABLE MEDIUM

TECHNICAL FIELD

The present invention relates to a communication device, a communication method, and a communication program.

BACKGROUND ART

Communication protocols for interconnection among applications in a wireless mesh network or a multi-hop wireless network are prescribed in ZigBee Alliance, Wi-SUN Alliance, and so on.

In ZigBee Alliance, for example, an end device which is a sensor terminal is driven by batteries. Therefore, the end device enables a communication function thereof only when the end device performs communication and shifts the communication function into a sleep state when the end device does not perform communication so as to reduce power consumption, in ZigBee Alliance.

As for an end device, power consumption is relatively easily reduced because it is sufficient to enable a communication function only when communication to this end device and communication from this end device are performed and to shift the communication function into a sleep state in other time. As for a router which is a relay node, however, the router relays communication from an end device in addition to communication to this router and communication from this router. Therefore, sleep control taking into account communication from an end device needs to be performed in a router (Non-Patent Literature 1, for example).

In the technique of Patent Literature 1, a packet in which time for continuing a sleep mode and so on are described is transmitted from a control terminal to all terminals in a network. Each terminal receiving the packet shifts to a sleep mode, and returns from the sleep mode after elapse of the time described in the packet. Power saving of all terminals including a relay terminal is thus realized in the technique of Patent Literature 1.

CITATION LIST

Patent Literature

Patent Literature 1: JP 2009-206749A

Non-Patent Literature

Non-Patent Literature 1: Yuki Kubo, Kentaro Yanagihara, Masanori Nozaki, "Electric Power Conservation Technology for Wireless Sensor Networks", Oki Technical Review, April 2009/Issue 214 Vol. 76 No. 1, pp. 32-35

SUMMARY OF INVENTION

Technical Problem

Since sleep control taking into account communication from an end device needs to be performed as described above in the conventional wireless mesh network and multi-hop wireless network, there is a problem that sleep control of a relay node is difficult.

Further, in the technique of Patent Literature 1, if a terminal does not receive a packet, the terminal does not shift to a sleep mode. Accordingly, when a terminal cannot receive a packet due to movement or removal of a terminal corresponding to a relay node or fluctuation in a wireless environment, this terminal cannot shift to the sleep mode, according to the technique of Patent Literature 1.

Further, longer sleep time is needed for reduction in power consumption. However, unless a plurality of terminals included in a network integrally perform communication according to the same schedule, sleep and wake-up are frequently repeated in each terminal and thus, the technique of Patent Literature 1 also has a problem that reduction in power consumption cannot be effectively achieved.

The present invention mainly aims at solving the problems described above. That is, the major object of the present invention is to securely realize effective sleep control.

Solution to Problem

A communication device according to the present invention, that switches a sleep state and an operation state in synchronization with a communication destination device, includes:

a communication scenario management unit to manage a communication scenario in which one or more data communication procedures among a data communication procedure for data communication by polling, a data communication procedure for push data communication, a data communication procedure for participation in a communication network, and a data communication procedure for shift to the sleep state are described as an execution data communication procedure that is to be executed in the operation state, and an execution order of the one or more execution data communication procedures is further described, and which is shared with the communication destination device; and a data communication procedure execution unit to execute the one or more execution data communication procedures described in the communication scenario with the communication destination device in the execution order described in the communication scenario, every time the sleep state is switched to the operation state.

Advantageous Effects of Invention

In the present invention, the communication device shares a communication scenario with a communication destination device. Further, the communication device executes the execution data communication procedure described in the communication scenario in the execution order described in the communication scenario, every time the sleep state is switched to the operation state.

Therefore, according to the present invention, the communication device and the communication destination device can integrally perform data communication according to the same schedule in accordance with the shared communication scenario and can securely perform effective sleep control.

DESCRIPTION OF EMBODIMENTS

Figure 1:
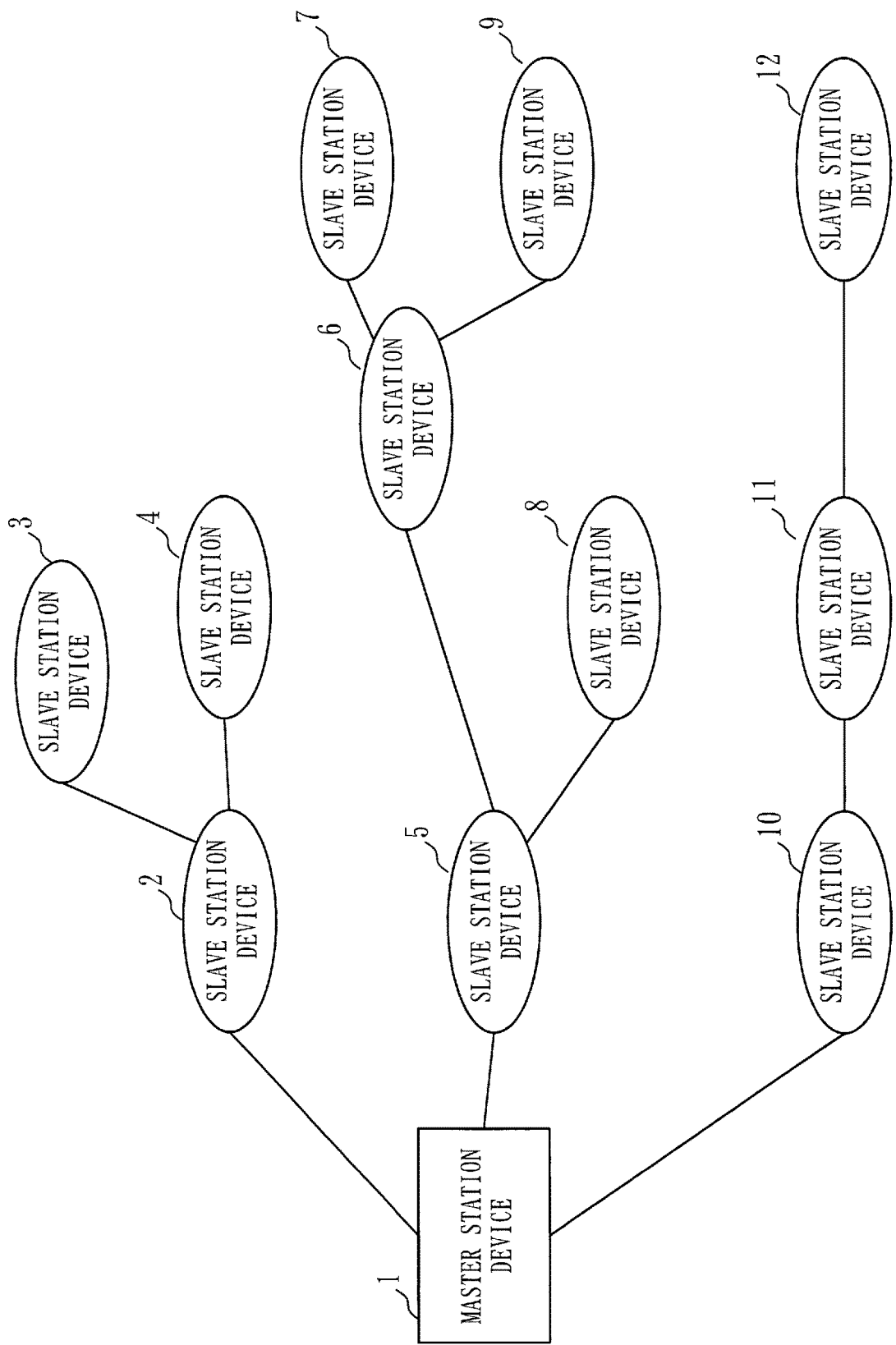
FIG. 1 illustrates a configuration example of a multi-hop wireless network according to Embodiment 1.

Embodiments of the present invention will be described below with reference to the accompanying drawings. Parts denoted with the same reference characters represent the same parts or corresponding parts in the following description and the drawings of the embodiments.

Embodiment 1

Description of Configuration

FIG. 1 illustrates a configuration example of a multi-hop wireless network according to the present embodiment.

The multi-hop wireless network according to the present embodiment is composed of a master station device 1 and a plurality of slave station devices 2 to 12.

The slave station devices 2 to 12 are distributedly arranged and each of the slave station devices 2 to 12 is connected with a nearby slave station device or the master station device 1 via a wireless link. Slave station devices which cannot be directly wirelessly connected with the master station device 1 are connected with the master station device 1 through relay of other slave station devices. Thus, a tree-like communication path centering the master station device 1 is configured as illustrated in FIG. 1.

When the slave station devices 2 to 12 do not need to be distinguished from each other, each of the slave station devices 2 to 12 is referred to as the slave station device 200.

Further, when the master station device 1 and the slave station devices 2 to 12 do not need to be distinguished from each other, each of the master station device 1 and the slave station devices 2 to 12 is referred to as the station device.

The master station device 1 operates while periodically switching a sleep mode (sleep state) and an operation mode (operation state). Here, after the master station device 1 periodically cancels the sleep state thereof and executes any one or more data communication procedures among a plurality of data communication procedures, which are described later, with the slave station device 200, the master station device 1 may shift to the sleep state again or do not have to actually be in the sleep state though the master station device 1 performs switching of the sleep mode and the operation mode so as to be a reference of each slave station device 200.

Further, each slave station device 200 operates while periodically switching the sleep mode and the operation mode in synchronization with the master station device 1. That is, after the slave station device 200 periodically cancels the sleep state thereof and executes any one or more data communication procedures among a plurality of data communication procedures, which are described later, with the master station device 1, the slave station device 200 shifts to the sleep state again.

Each of the master station device 1 and the slave station devices 200 corresponds to a communication device.

Each slave station device 200 corresponds to a communication destination device of the master station device 1. On the other hand, the master station device 1 corresponds to a communication destination device of the slave station device 200.

Further, an operation performed by the master station device 1 and the slave station device 200 is an example of a communication method and a communication program.

Figure 2:
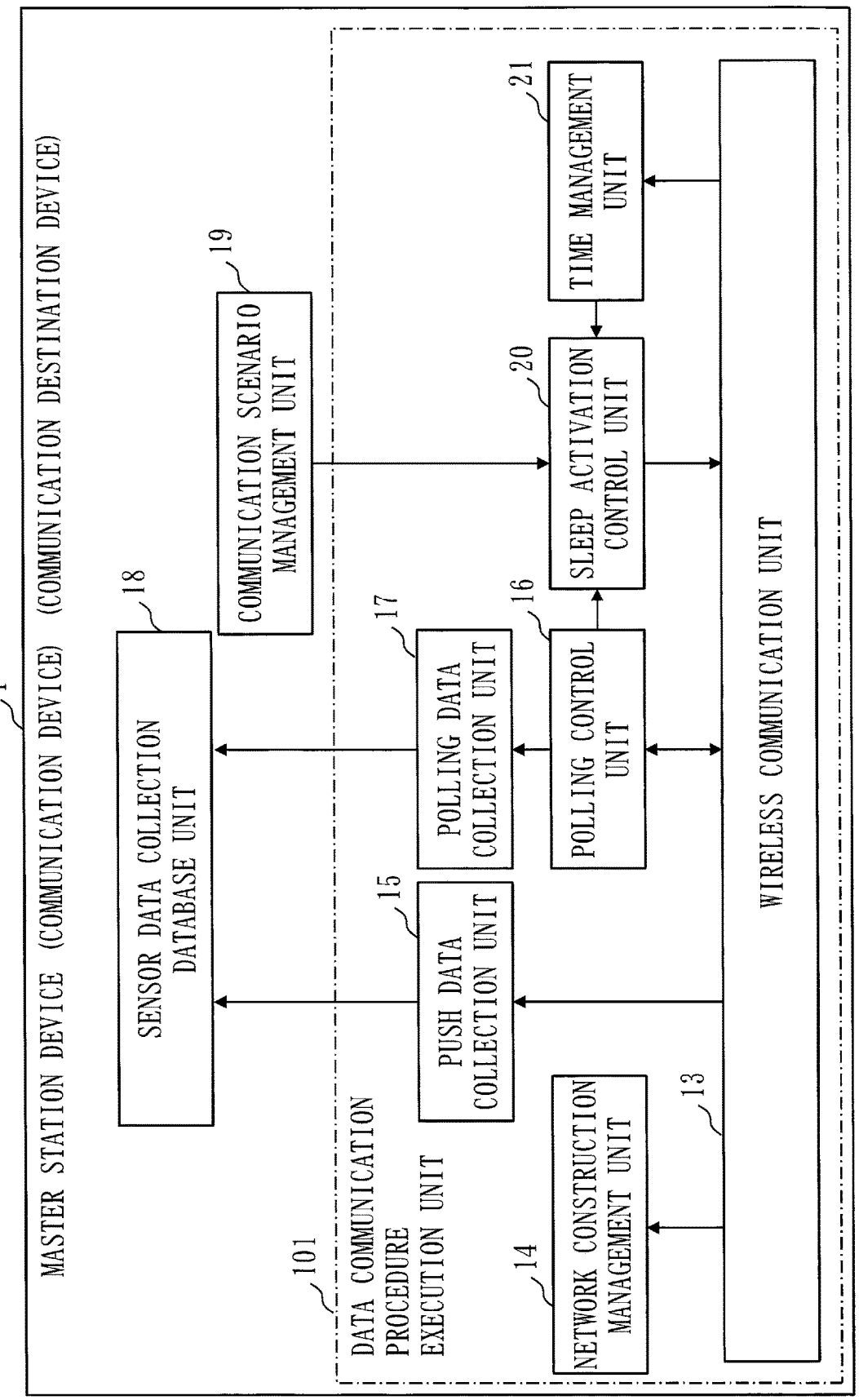
FIG. 2 illustrates a functional configuration example of a master station device according to Embodiment 1.

FIG. 2 illustrates a functional configuration example of the master station device 1 according to the present embodiment.

Figure 3:
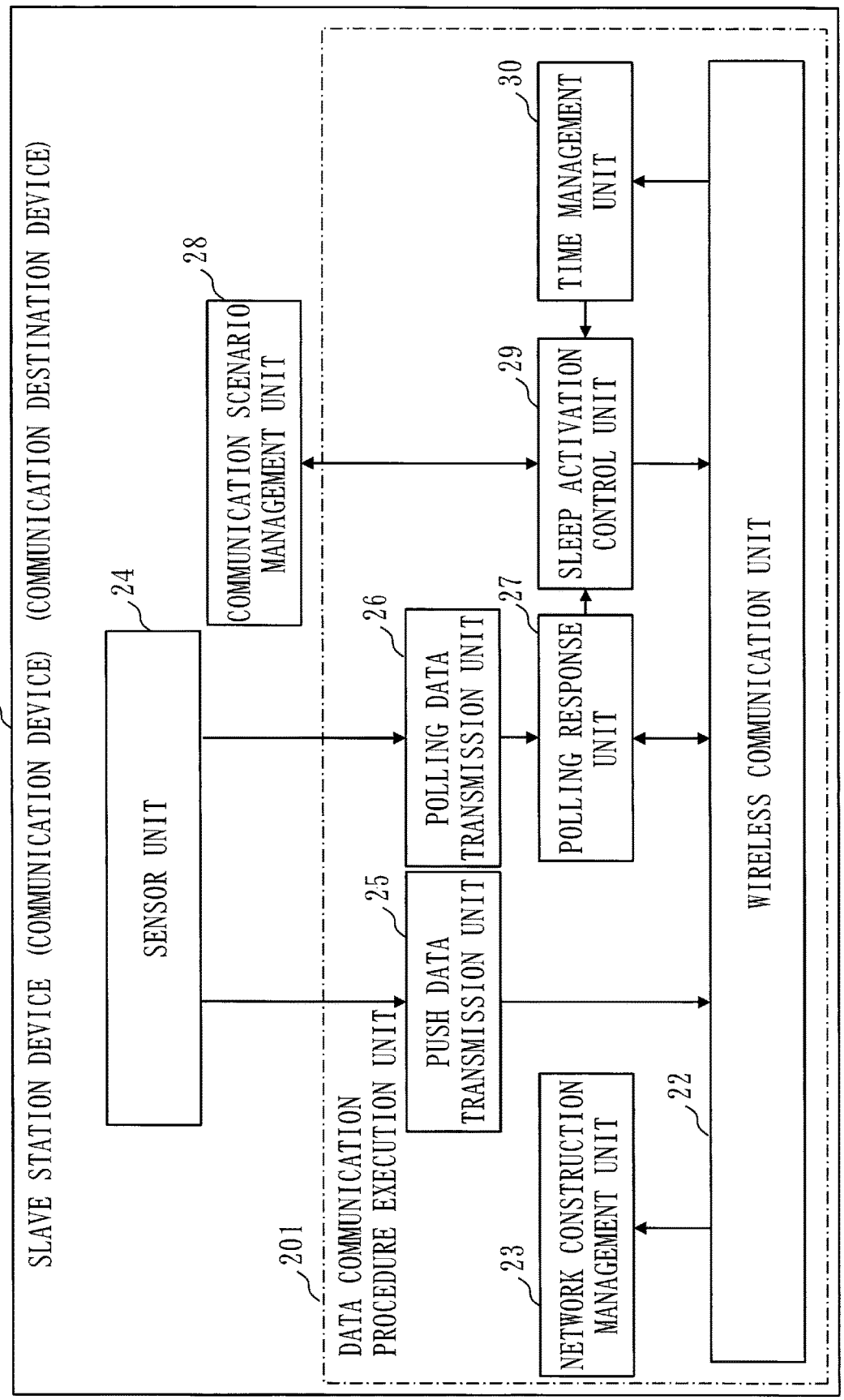
FIG. 3 illustrates a functional configuration example of a slave station device according to Embodiment 1.

Further, FIG. 3 illustrates a functional configuration example of the slave station device 200 according to the present embodiment.

Figure 25:
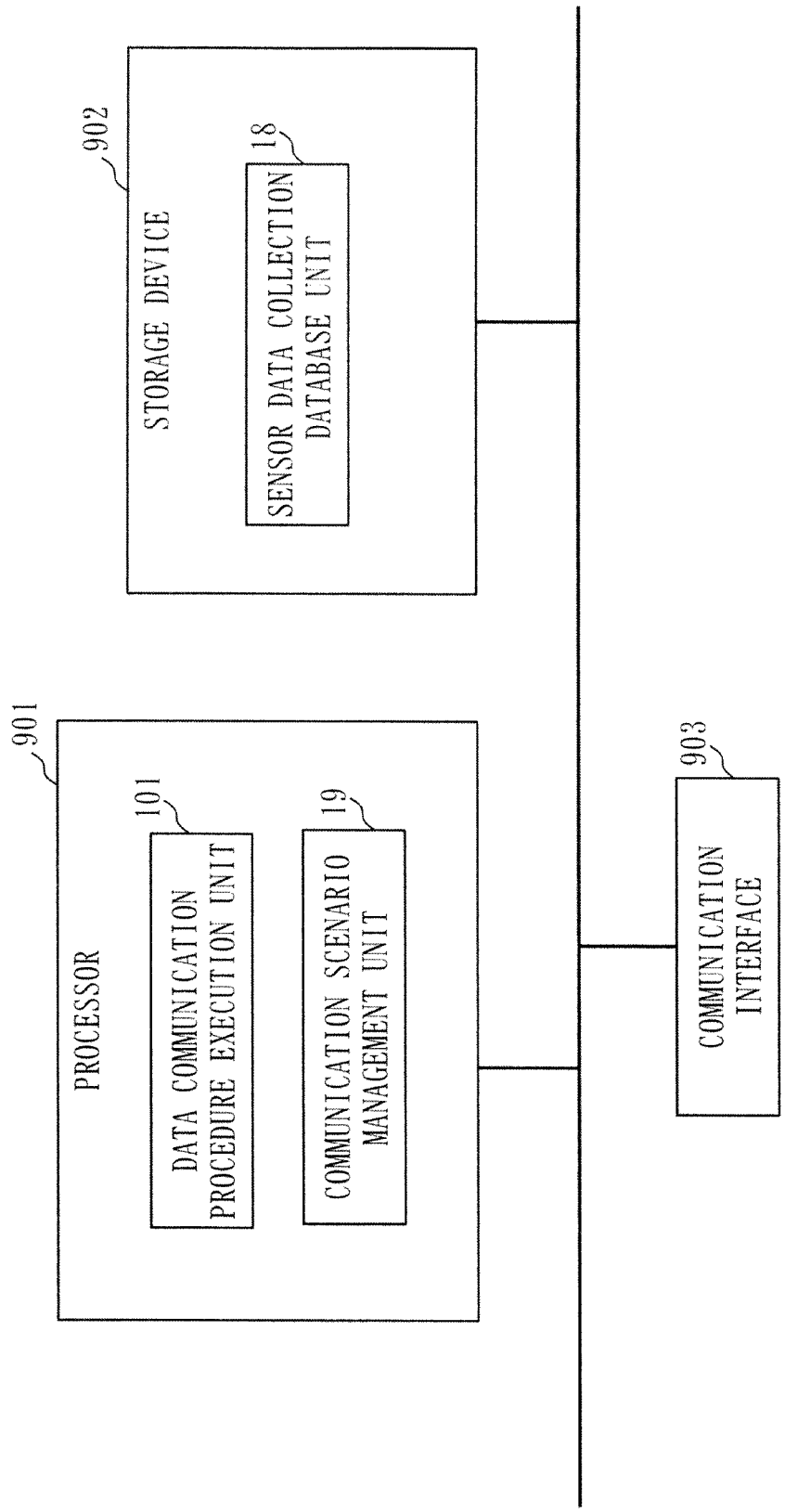
FIG. 25 illustrates a hardware configuration example of the master station device according to Embodiment 1.

Furthermore, FIG. 25 illustrates a hardware configuration example of the master station device 1 according to the present embodiment.

Figure 26:
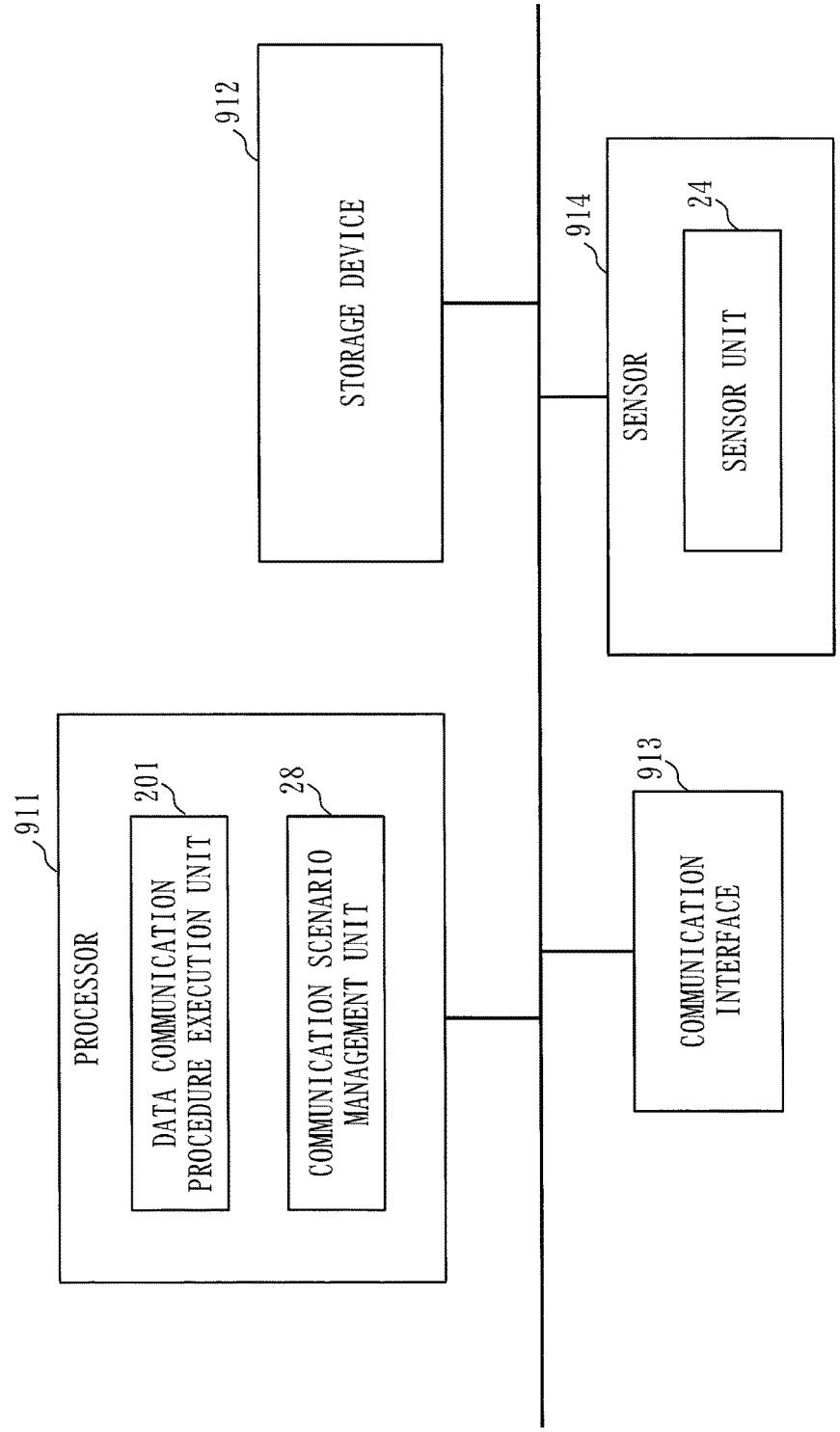
FIG. 26 illustrates a hardware configuration example of the slave station device according to Embodiment 1.

Furthermore, FIG. 26 illustrates a hardware configuration example of the slave station device 200 according to the present embodiment.

The hardware configuration example of the master station device 1 is first described with reference to FIG. 25.

The master station device 1 is a computer.

The master station device 1 includes a processor 901, a storage device 902, and a communication interface 903.

The storage device 902 stores programs for realizing functions of a data communication procedure execution unit 101 and a communication scenario management unit 19 which are illustrated in FIG. 2.

The processor 901 executes these programs so as to perform operations of the data communication procedure execution unit 101 and the communication scenario management unit 19.

FIG. 3 schematically illustrates a state that the processor 901 executes the programs for realizing the functions of the data communication procedure execution unit 101 and the communication scenario management unit 19.

The storage device 902 realizes a sensor data collection database unit 18 illustrated in FIG. 2.

The communication interface 903 is interface equipment for wireless communication with the slave station device 200.

The hardware configuration example of the slave station device 200 is now described with reference to FIG. 26.

The slave station device 200 is also a computer.

The slave station device 200 includes a processor 911, a storage device 912, a communication interface 913, and a sensor 914.

The storage device 912 stores programs for realizing functions of a data communication procedure execution unit 201 and a communication scenario management unit 28 which are illustrated in FIG. 3.

The processor 911 executes these programs so as to perform operations of the data communication procedure execution unit 201 and the communication scenario management unit 28.

FIG. 3 schematically illustrates a state that the processor 901 executes the programs for realizing the functions of the data communication procedure execution unit 201 and the communication scenario management unit 28.

The communication interface 913 is interface equipment for wireless communication with the master station device 1 or other slave station devices 200.

The sensor 914 realizes a sensor unit 24 illustrated in FIG. 3.

The functional configuration example of the master station device 1 is now described with reference to FIG. 2.

A wireless communication unit 13 performs wireless communication with the slave station device 200 using the communication interface 903.

A network construction management unit 14 manages participation of the slave station devices 2 to 12 in the multi-hop wireless network.

A push data collection unit 15 acquires data transmitted from the slave station device 200 by push data communication (referred to below as push data) via the wireless communication unit 13. Then, the push data collection unit 15 forwards the push data to the sensor data collection database unit 18 which is described later.

The push data communication is a communication form in which the slave station device 200 voluntarily transmits data, being different from later-described data communication performed in response to a polling request.

A polling control unit 16 transmits a polling request to all of the slave station devices 200 via the wireless communication unit 13. Further, the polling control unit 16 acquires data which is transmitted from each slave station device 200 in response to the polling request (referred to below as polling data). Then, the polling control unit 16 forwards the polling data to a polling data collection unit 17 which is described below.

The polling data collection unit 17 acquires polling data from the polling control unit 16 and forwards the acquired polling data to the sensor data collection database unit 18.

The sensor data collection database unit 18 stores push data forwarded from the push data collection unit 15 and polling data forwarded from the polling data collection unit 17 in a database.

The communication scenario management unit 19 manages a communication scenario.

The communication scenario is information describing for every time slot of a plurality of time slot, one or more execution data communication procedure/procedures, which is/are to be executed in an operation state, and an execution order of the one or more execution data communication procedure/procedures. The communication scenario is shared among the master station device 1 and the slave station devices 2 to 12.

Here, the time slot is unit time corresponding to an activation cycle of the master station device 1 and the slave station devices 2 to 12. That is, the time slot is a switching cycle from the sleep state to the operation state. If the master station device 1 and the slave station devices 2 to 12 are activated at five-minute interval, for example, each time slot is five minutes.

Further, one or more execution data communication procedure/procedures is/are a data communication procedure for data communication by polling (referred to below as a polling data communication phase), for example. Further, one or more execution data communication procedure/procedures may be a data communication procedure for push data communication (referred to below as a push data communication phase). Furthermore, one or more execution data communication procedure/procedures may be a data communication procedure for participation in a communication network (multi-hop wireless network) (referred to below as a network construction data communication phase). Furthermore, one or more execution data communication procedure/procedures may be a data communication procedure for shift to the sleep state (referred to below as a sleep instruction data communication phase).

Note that each of the polling data communication phase, the push data communication phase, the network construction data communication phase, and the sleep instruction data communication phase is also referred to as a data communication phase.

Details of the communication scenario are described later.

An operation of the communication scenario management unit 19 is an example of a communication scenario management step.

A sleep activation control unit 20 generates a sleep instruction, transmits a sleep instruction to the slave station devices 2 to 12, and controls sleep and activation of the master station device 1.

A time management unit 21 manages time which is a reference for sleep and activation.

In FIG. 2, the wireless communication unit 13, the network construction management unit 14, the push data collection unit 15, the polling control unit 16, the polling data collection unit 17, the sleep activation control unit 20, and the time management unit 21 are collectively referred to as the data communication procedure execution unit 101. An operation performed in the data communication procedure execution unit 101 corresponds to a data communication procedure execution step.

As the data communication procedure execution unit 101, the sleep activation control unit 20 cancels the sleep state in every time slot.

When a polling data communication phase 34 is described in a communication scenario, the wireless communication unit 13, the polling control unit 16, and the polling data collection unit 17 execute the polling data communication phase 34 as the data communication procedure execution unit 101. That is, the wireless communication unit 13 and the polling control unit 16 transmit a polling request to each slave station device 200 and receive polling data from each slave station device 200.

When a push data communication phase 33 is described in a communication scenario, the wireless communication unit 13 and the push data collection unit 15 receive push data from each slave station device 200 as the data communication procedure execution unit 101.

When a network construction data communication phase 32 is described in a communication scenario, the network construction management unit 14 and a wireless communication unit 13 transmit a participation response to the slave station device 200 as the data communication procedure execution unit 101.

When a sleep instruction data communication phase 35 is described in a communication scenario, the sleep activation control unit 20, the time management unit 21, and the wireless communication unit 13 transmit a sleep instruction including information for time synchronization to the slave station device 200 as the data communication procedure execution unit 101.

The functional configuration example of the slave station device 200 is now described with reference to FIG. 3.

The wireless communication unit 22 performs wireless communication with the master station device 1 or other slave station devices 200 using the communication interface 913.

If the slave station device 200 has not participated in the multi-hop wireless network, a network construction management unit 23 transmits a search request via the wireless communication unit 22 for participation in the multi-hop wireless network. If the slave station device 200 has participated in the multi-hop wireless network and receives a participation request for participating in the multi-hop wireless network from the slave station device 200 which has not participated in the multi-hop wireless network, the network construction management unit 23 forwards the participation request to the master station device 1 via the wireless communication unit 22.

The sensor unit 24 measures prescribed physical amounts. The sensor unit 24 measures physical amounts such as an ambient temperature, humidity, and an operation temperature, momentum, a power value, a voltage value, and a power consumption amount of a control object, for example. Note that physical amounts measured by the sensor unit 24 are not limited to the ones mentioned above.

A push data transmission unit 25 transmits sensor data representing a measurement result of the sensor unit 24 as push data to the master station device 1 via the wireless communication unit 22.

A polling data transmission unit 26 outputs sensor data representing a measurement result of the sensor unit 24 to a polling response unit 27, which is described later, when the polling response unit 27 acquires a polling request from the master station device 1.

The polling response unit 27 acquires a polling request from the master station device 1 via the wireless communication unit 22 and inquires the polling data transmission unit 26 about presence/absence of sensor data. When sensor data is present, the polling response unit 27 acquires the sensor data from the polling data transmission unit 26 and transmits the acquired sensor data as polling data to the master station device 1 via the wireless communication unit 22.

The communication scenario management unit 28 manages a communication scenario. A communication scenario managed by the communication scenario management unit 28 is the same as the communication scenario managed by the communication scenario management unit 19 of the master station device 1.

An operation of the communication scenario management unit 28 is an example of the communication scenario management step.

A sleep activation control unit 29 manages sleep and activation of the slave station device 200.

A time management unit 30 manages time which is a reference for sleep and activation.

In FIG. 3, the wireless communication unit 22, the network construction management unit 23, the push data transmission unit 25, the polling data transmission unit 26, the polling response unit 27, the sleep activation control unit 29, and the time management unit 30 are collectively referred to as the data communication procedure execution unit 201. An operation performed in the data communication procedure execution unit 201 corresponds to the data communication procedure execution step.

As the data communication procedure execution unit 201, the sleep activation control unit 29 cancels the sleep state in every time slot.

When the polling data communication phase 34 is described in a communication scenario, the wireless communication unit 22, the polling data transmission unit 26, and the polling response unit 27 execute the polling data communication phase 34 as the data communication procedure execution unit 201. That is, the wireless communication unit 22 and the polling response unit 27 receive a polling request, the polling data transmission unit 26 outputs sensor data to the polling response unit 27, and the wireless communication unit 22 and the polling response unit 27 transmit the sensor data as polling data to the master station device 1.

When the push data communication phase is described in a communication scenario, the wireless communication unit 22 and the push data transmission unit 25 transmit push data as the data communication procedure execution unit 201.

When the network construction data communication phase is described in a communication scenario, the network construction management unit 23 and the wireless communication unit 22 transmit a search request to the slave station device 200, which has participated in the multi-hop wireless network, or the master station device 1 as the data communication procedure execution unit 201. The network construction management unit 23 and the wireless communication unit 22 transmit non-participation search to the slave station device 200 which has not participated in the multi-hop wireless network.

When the sleep instruction data communication phase 35 is described in a communication scenario, the sleep activation control unit 29, the time management unit 30, and the wireless communication unit 22 receive a sleep instruction including information for time synchronization from the slave station device 200, which is a transmission station, and perform the time synchronization with the slave station device 200 which is the transmission station, as the data communication procedure execution unit 201. Further, the sleep activation control unit 29, the time management unit 30, and the wireless communication unit 22 transmit the sleep instruction including information for time synchronization to the slave station device 200 which is a reception station, as the data communication procedure execution unit 201.

The master station device 1 and each slave station device 200 shift to the sleep mode in time, in which the master station device 1 and each slave station device 200 do not need to perform communication, and stop operations of circuits required for wireless communication and an operation of a clock of a processor or a controller so as to reduce power consumption.

Further, when communication is performed in the multi-hop wireless network, data need to be transmitted/received among all of a station device which is a transmission source, a station device which performs relay, and a station device which is a transmission destination. Therefore, the master station device 1 and all of the slave station devices 200 synchronize time thereof and simultaneously shift to sleep or activation in the present embodiment. When the master station device 1 and all of the slave station devices 200 are in the operation mode, data transmission/reception is performed.

*Description of Operation*

The master station device 1 and all of the slave station devices 200 repeat the sleep mode and the operation mode in accordance with a communication scenario while synchronizing with time of the master station device 1.

Figure 4:
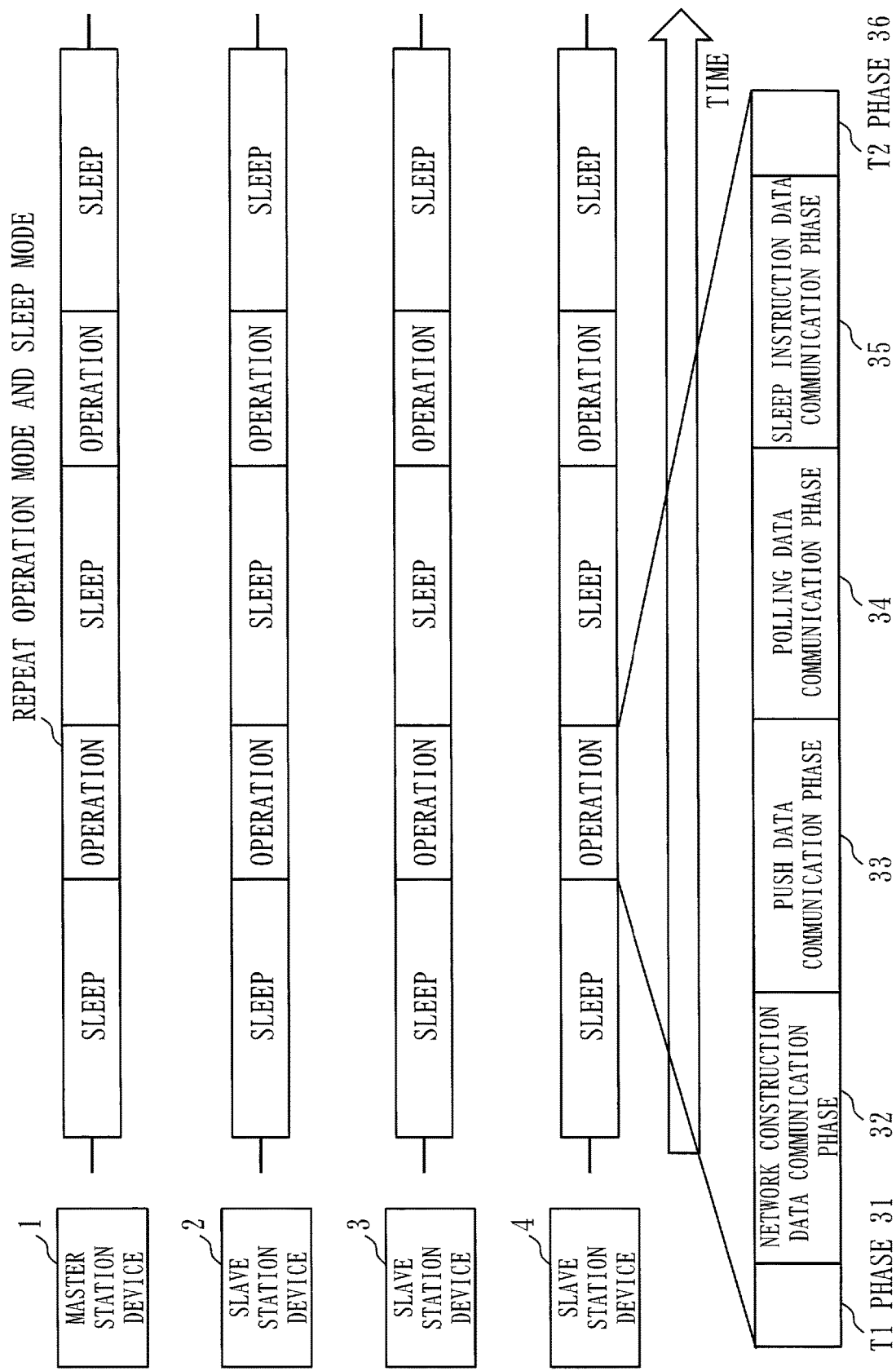
FIG. 4 illustrates an example of a sleep mode and an operation mode according to Embodiment 1.

FIG. 4 illustrates repetition of the sleep mode and the operation mode in the master station device 1 and the slave station devices 2 to 4.

Though illustration of the slave station devices 5 to 12 is omitted in FIG. 4 for the convenience of drawing, the sleep mode and the operation mode are repeated also in the slave station devices 5 to 12 in the same manner.

As illustrated in FIG. 4, a T1 phase 31 is performed at the start of the operation mode and a T2 phase 36 is performed at the end of the operation mode.

Between the T1 phase 31 and the T2 phase 36, at least one data communication phase among the network construction data communication phase 32, the push data communication phase 33, the polling data communication phase 34, and the sleep instruction data communication phase 35 is performed.

Though the network construction data communication phase 32, the push data communication phase 33, the polling data communication phase 34, and the sleep instruction data communication phase 35 are performed in the example of FIG. 4, only one of these may be performed, for example. Alternatively, two or three of these may be performed.

Further, a combination of communication phases may be changed for every chance of the operation mode. For example, the push data communication phase 33 and the polling data communication phase 34 may be performed in the n-th operation mode, and the push data communication phase 33, the polling data communication phase 34, and the sleep instruction data communication phase 35 may be performed in the n+1-th operation mode. The T1 phase 31 and the T2 phase 36 are performed in every operation mode.

Which data communication phase is performed in which operation mode is prescribed in a communication scenario.

Each of the T1 phase 31, the network construction data communication phase 32, the push data communication phase 33, the polling data communication phase 34, the sleep instruction data communication phase 35, and the T2 phase 36 has predetermined operation time.

The master station device 1 and each slave station device 200 perform each phase during prescribed operation time in an order described in the communication scenario and shift to the sleep mode when the operation time is up.

For example, the slave station device 4 communicates with the master station device 1 via the slave station device 2. Therefore, if the slave station device 2 is moved or removed, the slave station device 4 cannot communicate with the master station device 1. In addition, when the slave station device 4 cannot communicate with the slave station device 2 due to fluctuation in a wireless environment, the slave station device 4 cannot communicate with the master station device 1. Even in the state that the slave station device 4 cannot communicate with the master station device 1, the slave station device 4 repeats the operation mode and the sleep mode in accordance with the communication scenario.

Figure 5:
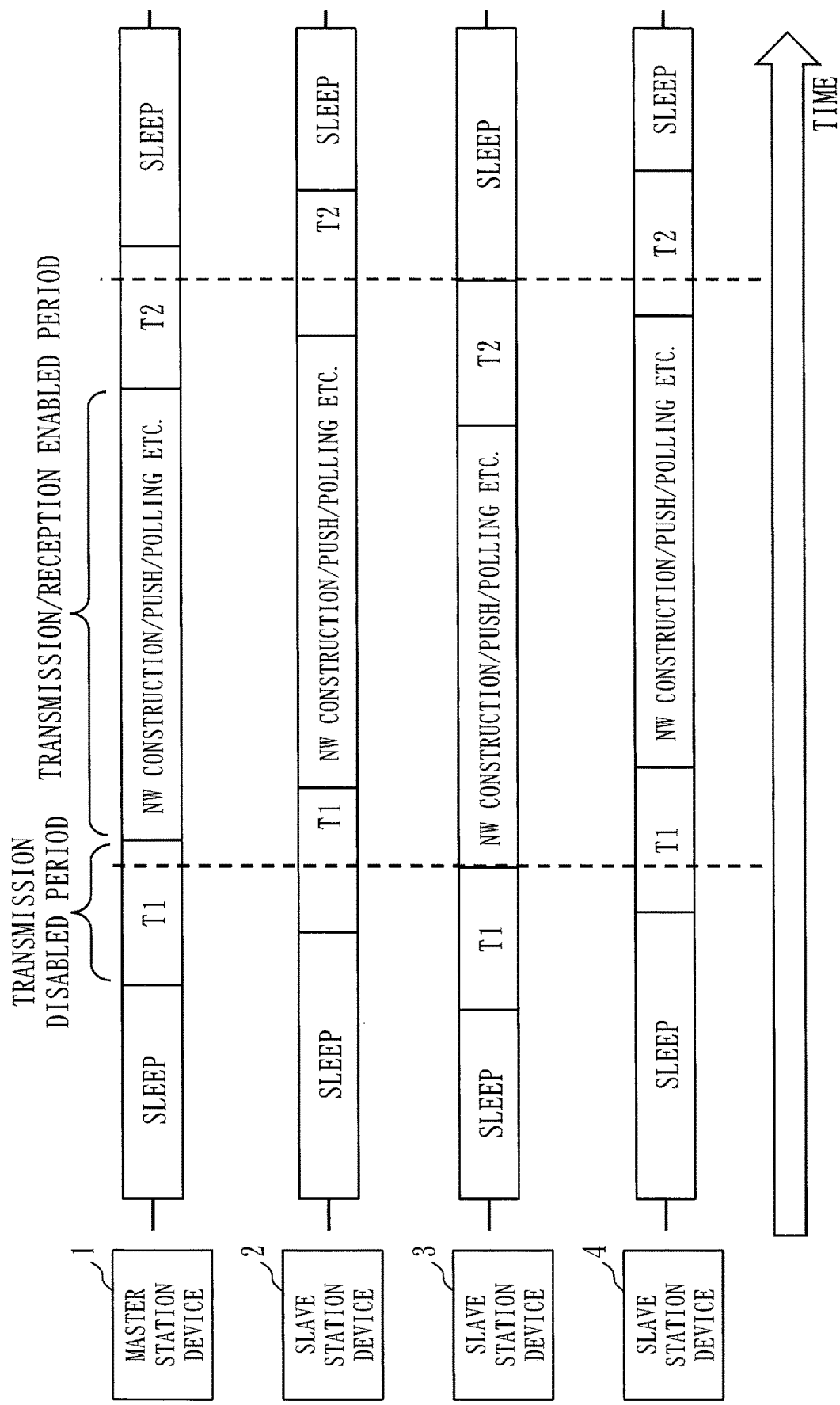
FIG. 5 illustrates an operation example of a T1 phase and a T2 phase according to Embodiment 1.

FIG. 5 illustrates an operation example of the master station device 1 and the slave station devices 2 to 4 in the T1 phase 31 and the T2 phase 36.

Though illustration of the slave station devices 5 to 12 is omitted in FIG. 5 for the convenience of drawing, the following operation is performed also in the slave station devices 5 to 12 in the same manner.

All of the slave station devices 2 to 12 which have participated in the multi-hop wireless network shift to sleep or activation in synchronization with time of the master station device 1. However, an error may be generated among activation timing of the slave station devices 2 to 12 due to, for example, an error among oscillators used in respective slave station devices 2 to 12. For instance, the case that time of the slave station device 2 is delayed from that of the master station device 1 and the slave station devices 3 to 12 is assumed. If the master station device 1 and the slave station devices 3 to 12 start performing data communication immediately after their activation, the data communication is failed because the slave station device 2 is still in the sleep state and cannot receive data.

The T1 phase 31 is provided to absorb such a time error. That is, the master station device 1 and the slave station devices 2 to 12 do not transmit data but the master station device 1 and the slave station devices 2 to 12 are permitted only to receive data in the T1 phase 31. After the elapse of the T1 phase 31, the master station device 1 and the slave station devices 2 to 12 are permitted to transmit data as well.

The T1 phase 31 corresponds to a first limitation period.

The T1 phase 31 is executed by the sleep activation control unit 20 in the master station device 1. The T1 phase 31 is executed by the sleep activation control unit 29 in the slave station devices 2 to 12.

When the data communication phase described in the communication scenario is completed, the master station device 1 and the slave station devices 2 to 12 shift to the sleep mode.

Here, the case that time of the slave station device 2 is delayed from that of the master station device 1 and the slave station devices 3 to 12, for example, is assumed. In this case, if the slave station device 2 transmits data to the master station device 1 or other slave station devices after the master station device 1 and the slave station devices 3 to 12 shift to the sleep mode, the master station device 1 or other slave station devices cannot receive the data and the data communication is thus failed.

The T2 phase 36 is provided to absorb such a time error. The master station device 1 and the slave station devices 2 to 12 do not transmit data but the master station device 1 and the slave station devices 2 to 12 are permitted only to relay data in the T2 phase 36. After the elapse of the T2 phase 36, the master station device 1 and the slave station devices 2 to 12 shift to the sleep mode. In other words, the master station device 1 and the slave station devices 2 to 12 need to complete the data communication phase by the T2 phase 36.

The T2 phase 36 corresponds to a second limitation period.

The T2 phase 36 is executed by the sleep activation control unit 20 in the master station device 1. The T2 phase 36 is executed by the sleep activation control unit 29 in the slave station devices 2 to 12.

Figure 6:
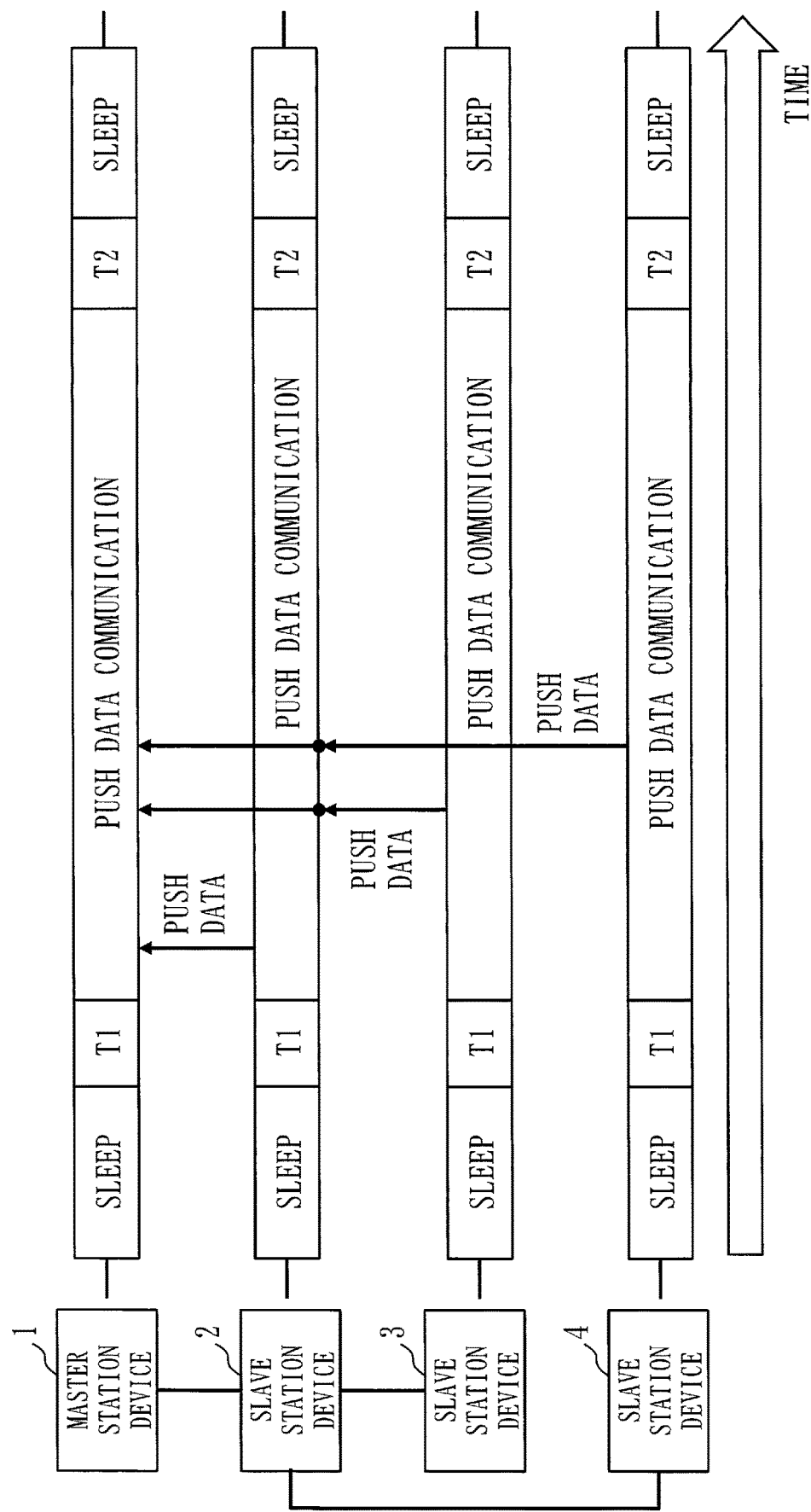
FIG. 6 illustrates an operation example in a push data communication phase according to Embodiment 1.

FIG. 6 illustrates an operation example of the master station device 1 and the slave station devices 2 to 4 in the push data communication phase 33.

Though illustration of the slave station devices 5 to 12 is omitted in FIG. 6 for the convenience of drawing, the following operation is performed also in the slave station devices 5 to 12 in the same manner.

In the push data communication phase 33, push data transmission is performed under the initiative of the slave station devices so that the slave station devices 2 to 12 quickly transmit, to the master station device 1, sensor data with high urgency among sensor data by the sensor unit 24. When all of the slave station devices 2 to 12 which have shifted to the push data communication phase 33 have sensor data to be transmitted to the master station device 1, the slave station devices 2 to 12 voluntarily transmit the sensor data as push data to the master station device 1. To voluntarily transmit sensor data means to transmit the sensor data to the master station device 1 without reception of a polling request from the master station device 1. Here, a slave station device which is not directly connected with the master station device 1 transmits push data to a slave station device which is positioned upstream on a path to the master station device 1, as described above.

In FIG. 6, the slave station device 2 which is directly connected with the master station device 1 directly transmits push data to the master station device 1. On the other hand, each of the slave station device 3 and the slave station device 4 which is connected with the slave station device 2 transmits push data to the slave station device 2. The slave station device 2 relays the push data from the slave station device 3 and the push data from the slave station device 4 to the master station device 1.

Transmission timing of push data needs to be adjusted so as to avoid overlap of transmission timing of push data among the slave station devices 2 to 12.

For example, it is conceivable that transmission timing of push data is adjusted by providing transmission delay time to each slave station device depending on the number of hops from the master station device 1. Accordingly, transmission of push data is performed in sequence from the slave station device closest to the master station device 1 in the push data communication phase 33.

In an opposite manner, longer transmission delay time may be set in the slave station devices whose number of hops from the master station device 1 is smaller. In this case, transmission of push data is performed in sequence from the slave station device which is farthest from the master station device 1 in the push data communication phase.

Further, transmission delay time may be provided in respective slave station devices at random without depending on the number of hops.

Any method may be employed as a method for adjusting push data transmission timing of the slave station devices 2 to 12.

The push data communication phase 33 is executed by the wireless communication unit 13 and the push data collection unit 15 in the master station device 1. Meanwhile, the push data communication phase 33 is executed by the wireless communication unit 22 and the push data transmission unit 25 in the slave station devices 2 to 12.

Figure 7:
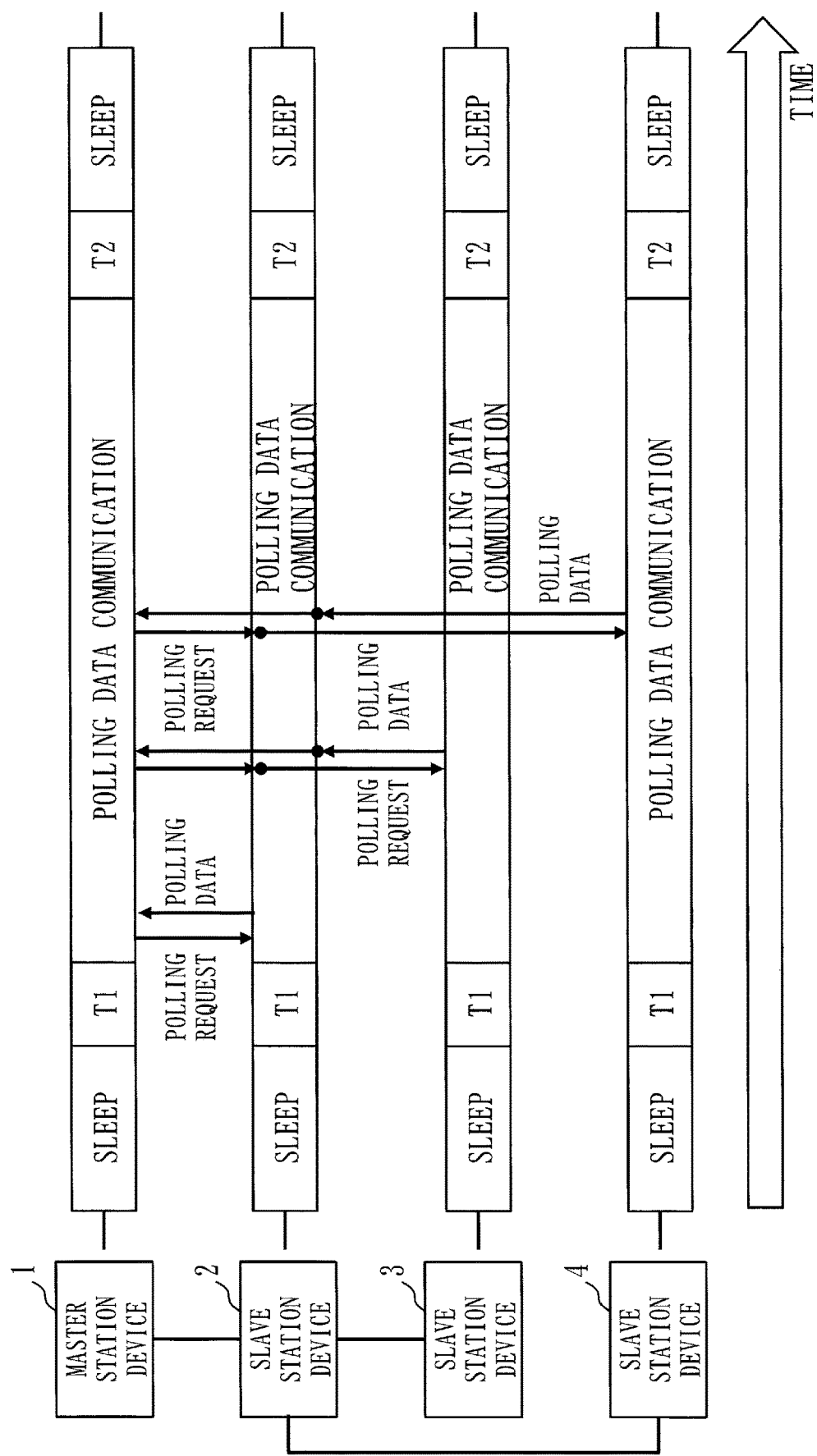
FIG. 7 illustrates an operation example in a polling data communication phase according to Embodiment 1.

FIG. 7 illustrates an operation example of the master station device 1 and the slave station devices 2 to 4 in the polling data communication phase 34.

Though illustration of the slave station devices 5 to 12 is omitted in FIG. 7 for the convenience of drawing, the following operation is performed also in the slave station devices 5 to 12 in the same manner.

In the polling data communication phase 34, the master station device 1 transmits a polling request to the slave station device 200 so as to collect regular data such as sensor data. The slave station device 200 which has received the polling request transmits sensor data by the sensor unit 24 as polling data to the master station device 1. When the master station device 1 receives polling data or if the master station device 1 does not receive polling data for a certain period of time, the master station device 1 transmits the polling request to the next slave station device 200. Sufficient time is secured in the polling data communication phase 34 so that the master station device 1 transmits a polling request to all of the slave station devices 2 to 12 and receives polling data from all of the slave station devices 2 to 12.

Here, the polling control unit 16, the polling data collection unit 17, and the sensor data collection database unit 18 are not necessarily provided inside the master station device 1, and these functions may be provided to an external device in the outside of the master station device 1.

That is, the external device may instruct the master station device 1 to transmit a polling request and the master station device 1 may transmit the polling request to the slave station devices 2 to 12 in sequence.

Further, the master station device 1 may forward polling data received from the slave station devices 2 to 12 to the external device and the external device may store the polling data in a database incorporated in the external device.

The polling data communication phase 34 is executed by the wireless communication unit 13, the polling control unit 16, and the polling data collection unit 17 in the master station device 1. The polling data communication phase 34 is executed by the wireless communication unit 22, the polling data transmission unit 26, and the polling response unit 27 in the slave station devices 2 to 12.

Figure 8:
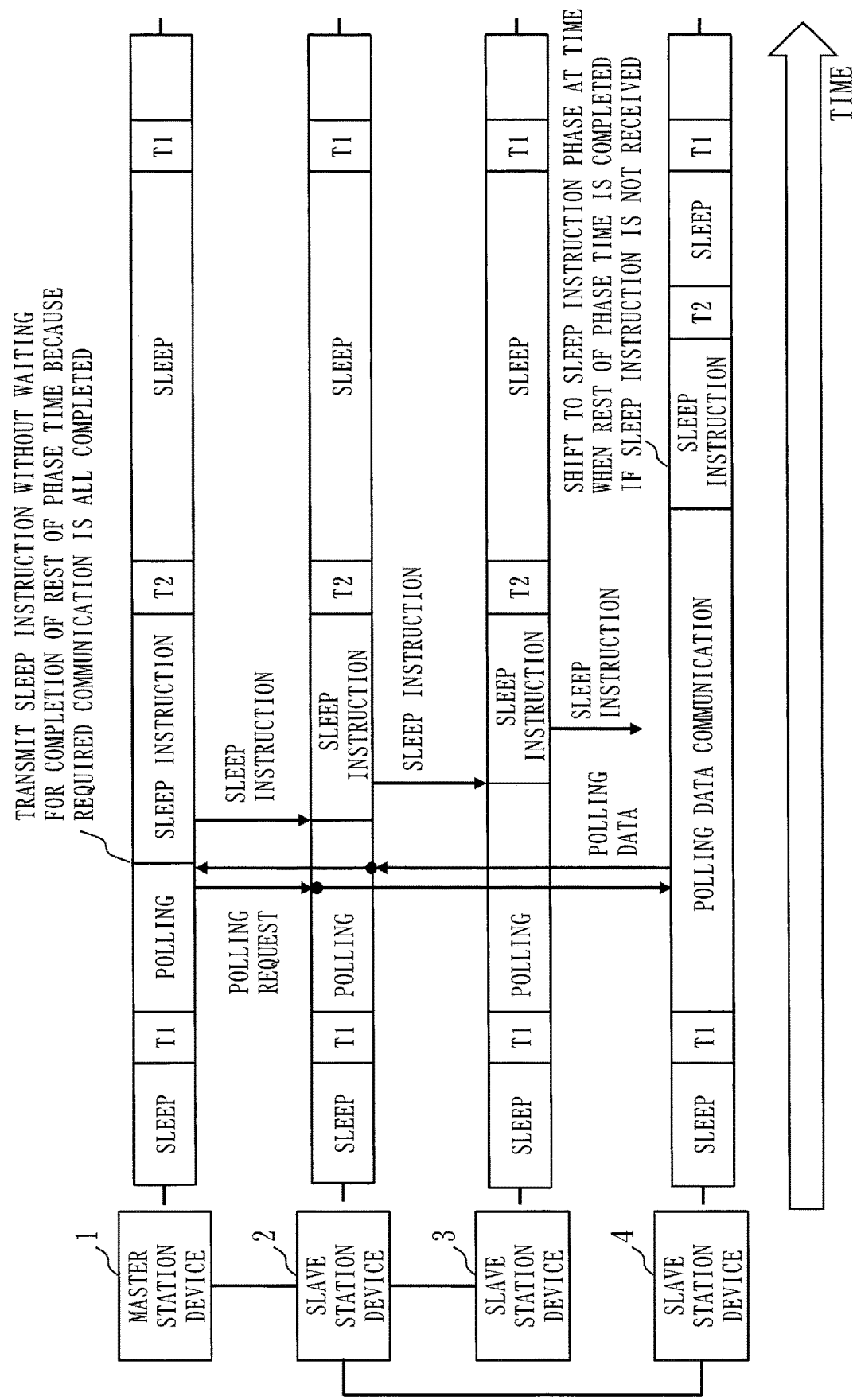
FIG. 8 illustrates an operation example in a sleep instruction data communication phase according to Embodiment 1.

FIG. 8 illustrates an operation example of the master station device 1 and the slave station devices 2 to 4 in the sleep instruction data communication phase 35.

The polling data communication phase 34 is assigned with time that is necessary for the master station device 1 to receive polling data from all of the slave station devices 2 to 12. However, in a state that there are a few slave station devices which participate in the multi-hop wireless network, for example, the master station device 1 sometimes completes reception of polling data from all of the slave station devices before operation time of the polling data communication phase 34 is up.

In such a case, it is desirable to shift to the sleep mode without waiting for the completion of the operation time of the polling data communication phase 34.

When the slave station devices which have participated in the multi-hop wireless network are the slave station devices 2 to 4, the master station device 1 transmits a sleep instruction to the slave station devices 2 to 4 by multicast at the time when reception of polling data from the slave station devices 2 to 4 is completed, as illustrated in FIG. 8.

The slave station device 2 which has received the sleep instruction transmits this sleep instruction to the slave station device 3 and the slave station device 4 by multicast. Then, when the operation time of the sleep instruction data communication phase 35 is up, the slave station device 2 shifts to the T2 phase 36. Here, the slave station device 2 may delay transmission timing at random in the sleep instruction data communication phase 35 so as to avoid overlap of sleep instruction transmission timing with that of another slave station device which transmits the sleep instruction.

In FIG. 8, the slave station device 4 has not received the sleep instruction from the slave station device 2. In this case, the slave station device 4 shifts to the T2 phase 36 at the time when the operation period of the polling data communication phase 34 is completed as the case where the sleep instruction data communication phase 35 is not included.

The sleep instruction data communication phase 35 is executed by the wireless communication unit 13 and the time management unit 21 in the master station device 1. Meanwhile, the sleep instruction data communication phase 35 is executed by the wireless communication unit 22 and the time management unit 30 in the slave station devices 2 to 12.

FIG. 8 illustrates an example in which the sleep instruction data communication phase 35 is started earlier than prescribed start time when the polling data communication phase 34, which is a preceding communication phase (preceding data communication procedure) of the sleep instruction data communication phase 35, ends earlier than prescribed end time.

In addition, when the push data communication phase 33, which is a preceding communication phase (preceding data communication procedure) of the sleep instruction data communication phase 35, ends earlier than prescribed end time, the sleep instruction data communication phase 35 may be started earlier than prescribed start time.

In the present embodiment, time of the master station device 1 and time of all of the slave station devices 2 to 12 need to be synchronized with each other so as to synchronize activation and sleep timing among the master station device 1 and all of the slave station devices 2 to 12. Time information of a transmission station is set in the sleep instruction. The slave station device 200 which has received the sleep instruction synchronizes with time of the transmission source. Further, the slave station device 200 which has received the sleep instruction transmits the sleep instruction as a transmission station to the slave station device 200 which is positioned downstream. In this case, the slave station device 200 which serves as the transmission station sets the time information of the slave station device 200 which serves as the transmission station.

When the sleep instruction is relayed from the slave station device 200 which is a transmission station (upstream) to the slave station device 200 which is a reception station (downstream) along a path from the master station device 1, time of the transmission station is reflected to time of the reception station in sequence, thus time synchronization of the whole of the system is performed.

Figure 9:
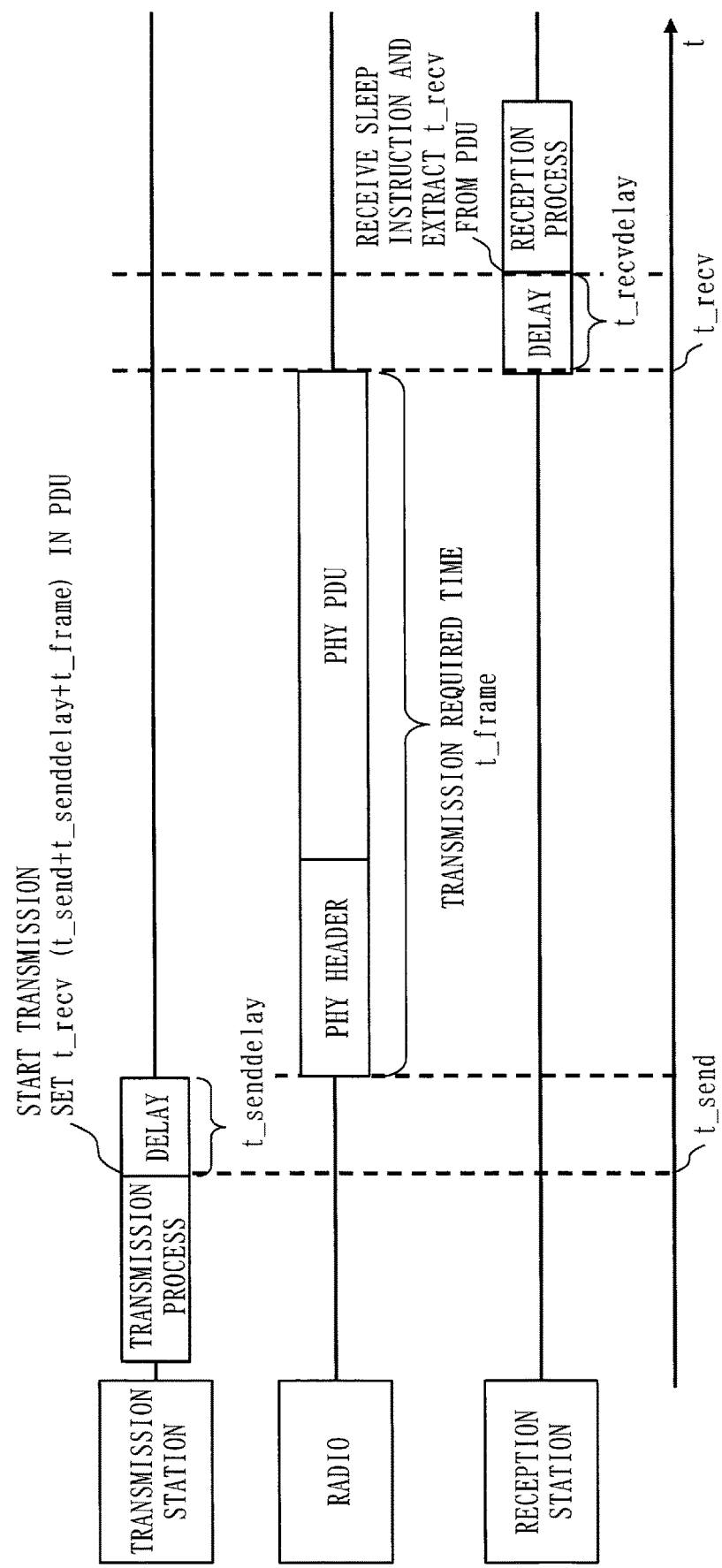
FIG. 9 illustrates an example of a time synchronization procedure according to Embodiment 1.

FIG. 9 illustrates a procedure of time synchronization.

In the procedure of FIG. 9, a transmission station predicts time of a tail of a sleep instruction on the radio and includes the predicted reference time (predicted reception time) in the sleep instruction.

Specifically, the transmission station calculates predicted reception time t_recv which is predicted as the tail, on the radio, of a PDU (Protocol Data Unit) in the sleep instruction which is a wireless frame.

The transmission station calculates the predicted reception time t_recv by adding transmission delay time t_senddelay and transmission required time t_frame of the sleep instruction on the transmission path, to transmission start time t_send, the transmission delay time t_senddelay being delay time from the transmission start time t_send to actual start of transmission of the sleep instruction to a transmission path, the transmission start time t_send being time at which a transmission process of the sleep instruction is started. Then, the transmission station sets the calculated predicted reception time t_recv in the PDU of the sleep instruction.

The reception station measures reception delay time t_recvdelay which is delay time from time at which completion of reception of the sleep instruction is detected to actual acquisition of the predicted reception time t_recv from the PDU. Then, the reception station calculates time, which is obtained by adding the reception delay time t_recvdelay to the predicted reception time t_recv, as current time of the transmission station and synchronizes with the transmission station by using this time.

Note that the reference time (time set in the PDU) is not limited to the reception time of the tail of the PDU but may be reception time of an arbitrary point such as a part of a PHY header as long as the transmission station and the reception station can mutually recognize the time.

The procedure of FIG. 9 is executed by the wireless communication unit 13, the sleep activation control unit 20, and the time management unit 21 in the master station device 1. The procedure of FIG. 9 is executed by the wireless communication unit 22, the sleep activation control unit 29, and the time management unit 30 in the slave station device 200.

That is, the time management unit 21 calculates the predicted reception time t_recv in the master station device 1 as a transmission station. Then, the sleep activation control unit 20 adds the predicted reception time t_recv to a sleep instruction and the wireless communication unit 13 wirelessly transmits the sleep instruction.

Further, when the slave station device 200 operates as a transmission station, the time management unit 30 calculates the predicted reception time t_recv. Then, the sleep activation control unit 29 adds the predicted reception time t_recv to a sleep instruction and the wireless communication unit 22 wirelessly transmits the sleep instruction. On the other hand, in operation as a reception station, the wireless communication unit 22 receives the sleep instruction. Then, the sleep activation control unit 29 measures the reception delay time t_recvdelay and the time management unit 30 calculates current time of the transmission station based on the predicted reception time t_recv and the reception delay time t_recvdelay.

Figure 10:
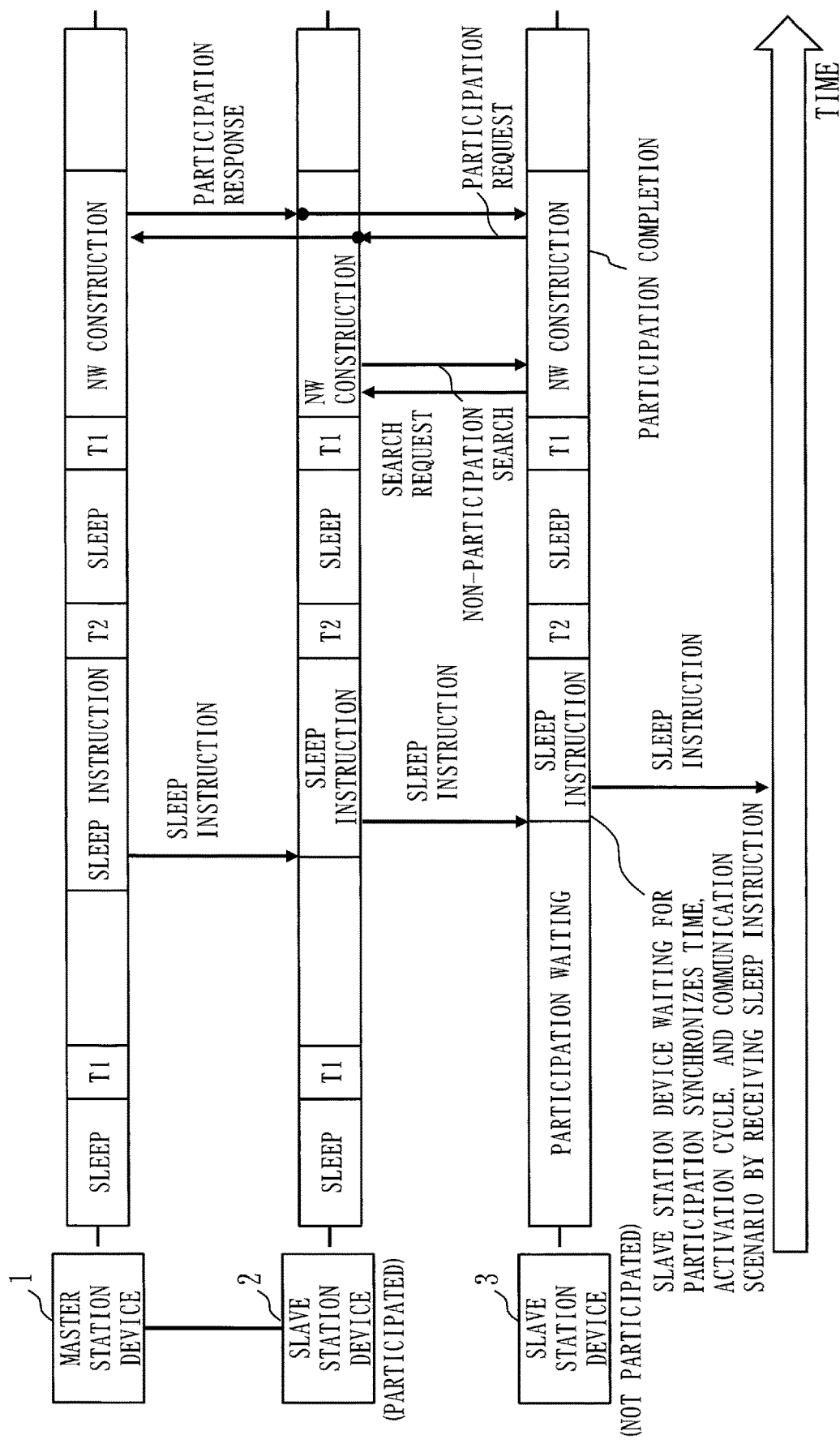
FIG. 10 illustrates an example of a participation procedure in the multi-hop wireless network according to Embodiment 1.

FIG. 10 illustrates a procedure until the slave station device 3 participates in the multi-hop wireless network.

In FIG. 10, the slave station device 2 has already participated in the multi-hop wireless network and the slave station device 3 has not participated in the multi-hop wireless network yet.

The slave station device 3 waits to receive a sleep instruction as a participation waiting state after activation thereof. The master station device 1 transmits a sleep instruction in the sleep instruction data communication phase 35. The slave station device 3 receives the sleep instruction forwarded by the slave station device 2. If there is a relay destination of the sleep instruction, the slave station device 3 relays the sleep instruction to the relay destination. Then, the slave station device 3 synchronizes with time of the slave station device 2 by using the received sleep instruction in accordance with the procedure illustrated in FIG. 9. Accordingly, the slave station device 3 synchronizes with the master station device 1 and other slave station devices included in the multi-hop wireless network. Here, an activation cycle and a communication scenario to be used in the next activation are set in the sleep instruction. The slave station device 3 calculates the next activation time based on the activation cycle in the sleep instruction. Then, the slave station device 3 shifts to the sleep mode through the T2 phase 36. After that, the slave station device 3 is activated at the calculated next activation time.

The slave station device 3 transmits a search request which is a wireless frame to nearby slave station devices by multicast in the network construction data communication phase 32 after the activation thereof. The slave station device 2 which has already participated receives the search request and transmits non-participation search which is a wireless frame to the slave station device 3. When the slave station device 3 receives the non-participation search from the slave station device 2, the slave station device 3 transmits a participation request for the master station device 1 to the slave station device 2 and requests the slave station device 2 to relay the participation request to the master station device 1. The slave station device 2 transmits the participation request from the slave station device 3 to the master station device 1. The master station device 1 receives the participation request from the slave station device 2. Then, the master station device 1 transmits a participation response to the slave station device 3 via the slave station device 2.

The slave station device 3 receives the participation response. Accordingly, a communication path from the slave station device 3 to the mater station device 1 is established and the participation of the slave station device 3 in the multi-hop wireless network is thus completed.

The master station device 1 registers the network construction data communication phase 32 at timing when the master station device 1 desires non-participation slave station devices to participate in the multi-hop wireless network.

The network construction data communication phase 32 is executed by the wireless communication unit 13 and the network construction management unit 14 in the master station device 1. The network construction data communication phase 32 is executed by the wireless communication unit 22 and the network construction management unit 23 in the slave station devices 2 to 12.

Figure 11:
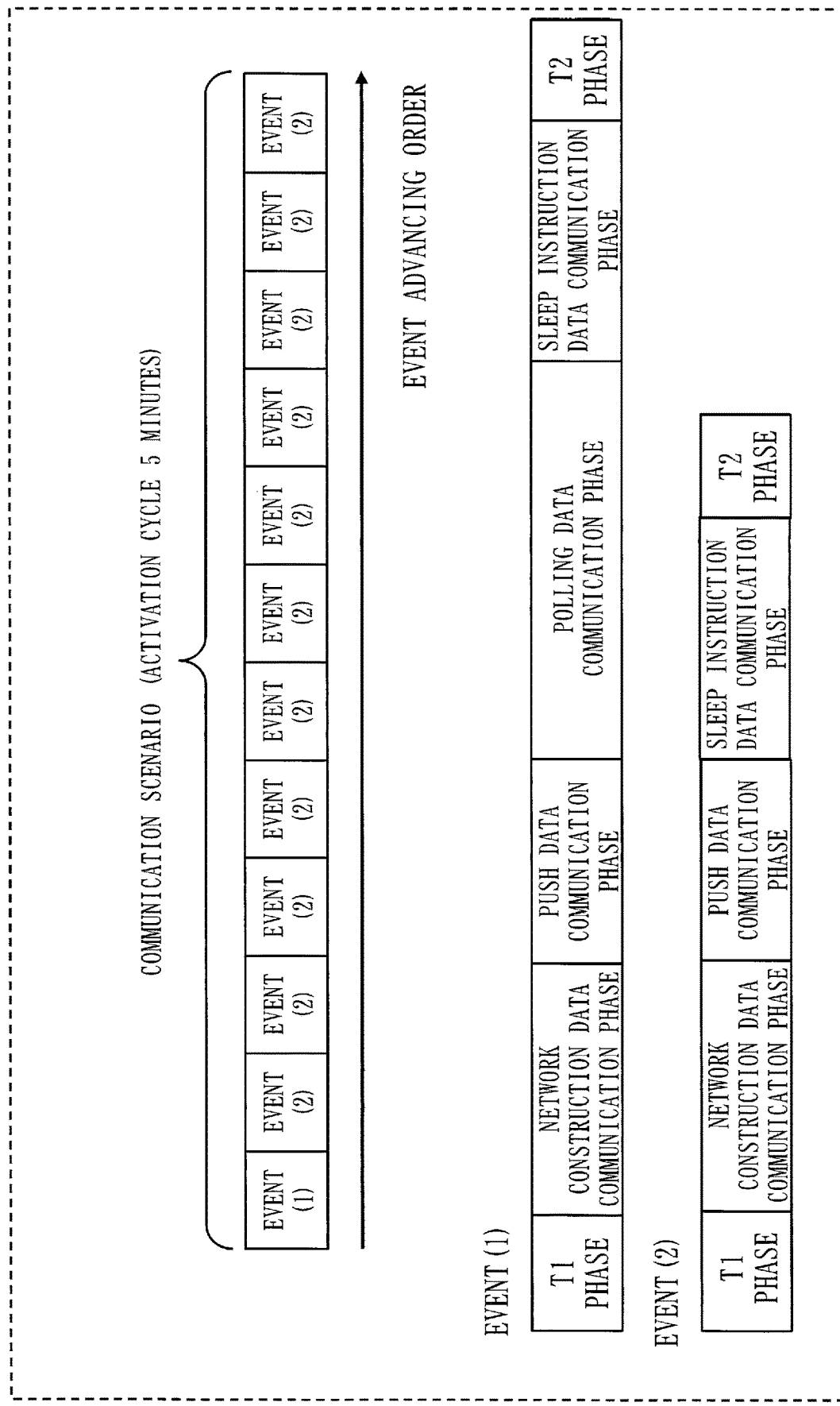
FIG. 11 illustrates an example of a communication scenario according to Embodiment 1.

FIG. 11 illustrates an operation based on a communication scenario.

The communication scenario of FIG. 11 is preliminarily set or distributed to the master station device 1 and the slave station devices 2 to 12 beforehand.

In this example, it is assumed that a one-hour scenario having the five-minute activation cycle is set, in which one time of event (1) which includes the polling data communication phase 34 and eleven times of event (2) which does not include the polling data communication phase 34 are combined.

Figure 12:
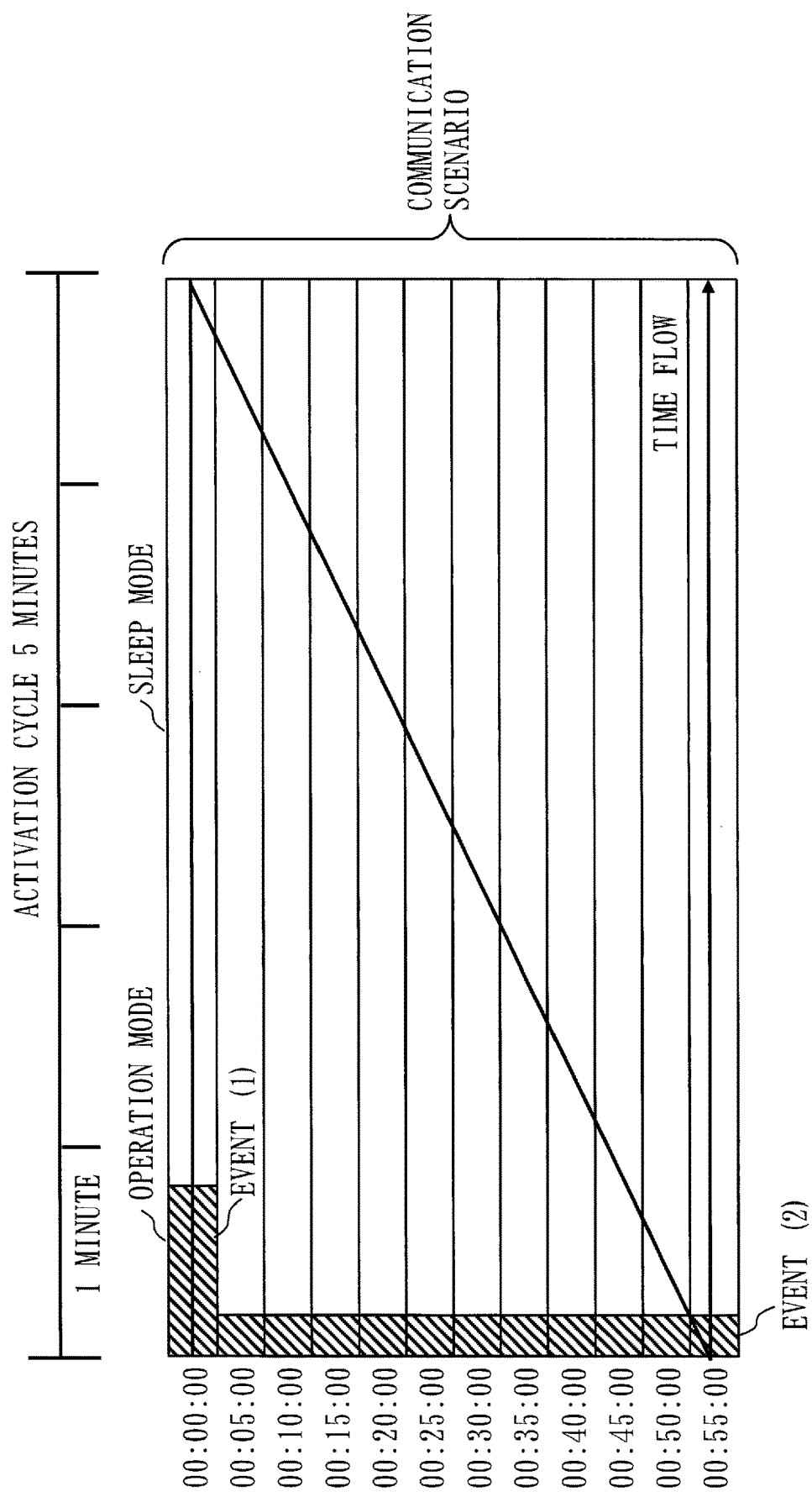
FIG. 12 illustrates an example of the operation mode and the sleep mode for every time slot according to Embodiment 1.

FIG. 12 illustrates distribution of the operation mode and the sleep mode for every time slot in activation.

In FIG. 12, a hatched part represents time of the operation mode.

The event (1) is performed in the time slot (00:00:00) at the first activation. Since the polling data communication phase 34 is performed in the event (1), the operation mode for the event (1) is longer than that for the event (2). The master station device 1 and the slave station devices 2 to 12 are activated at time 00:00:00 and execute data communication phases described in the event (1) after the T1 phase 31. When the data communication phases of the event (1) are completed, the master station device 1 and the slave station devices 2 to 12 shift to the sleep mode after the T2 phase 36.

Since the activation cycle is five minutes, the master station device 1 and the slave station devices 2 to 12 are activated at time 00:05:00 and execute data communication phases described in the event (2) after the T1 phase 31. When the data communication phases of the event (2) are completed, the master station device 1 and the slave station devices 2 to 12 shift to the sleep mode after the T2 phase 36.

Hereinafter, the master station device 1 and the slave station devices 2 to 12 are activated every five minutes and execute the event (2).

After the time slot at the last activation (00:55:00), the master station device 1 and the slave station devices 2 to 12 execute the event (1) as is the case with the time slot (00:00:00) at the first activation.

Even in the state that the slave station devices 2 to 12 cannot communicate with a slave station device positioned upstream of the path, the slave station devices 2 to 12 repeat the activation and the sleep in accordance with the communication scenario.

Description of Advantageous Effects of Embodiment

In the present embodiment, the master station device and the slave station device share a communication scenario with a communication destination device. Therefore, according to the present embodiment, even in the state that a slave station device positioned downstream cannot communicate with a slave station device positioned upstream, it is possible to securely repeat activation and sleep in accordance with the communication scenario.

Further, in the present embodiment, when the master station device and the slave station device cancel the sleep state in every time slot at activation, the master station device and the slave station device execute data communication phases described in the communication scenario in an execution order described in the communication scenario. Therefore, according to the present embodiment, the master station device and the slave station device can integrally perform data communication in the same schedule and can efficiently perform sleep control.

Here, when any of station devices is not driven by batteries (driven by commercial power source, for example), this station device does not need to shift to the sleep mode even at timing when the station device is supposed to shift to the sleep mode.

If the multi-hop wireless network includes a station device driven by batteries, the station device driven by batteries shifts to the sleep mode through the above-described procedure and thus power saving is achieved.

Embodiment 2

Figure 27:
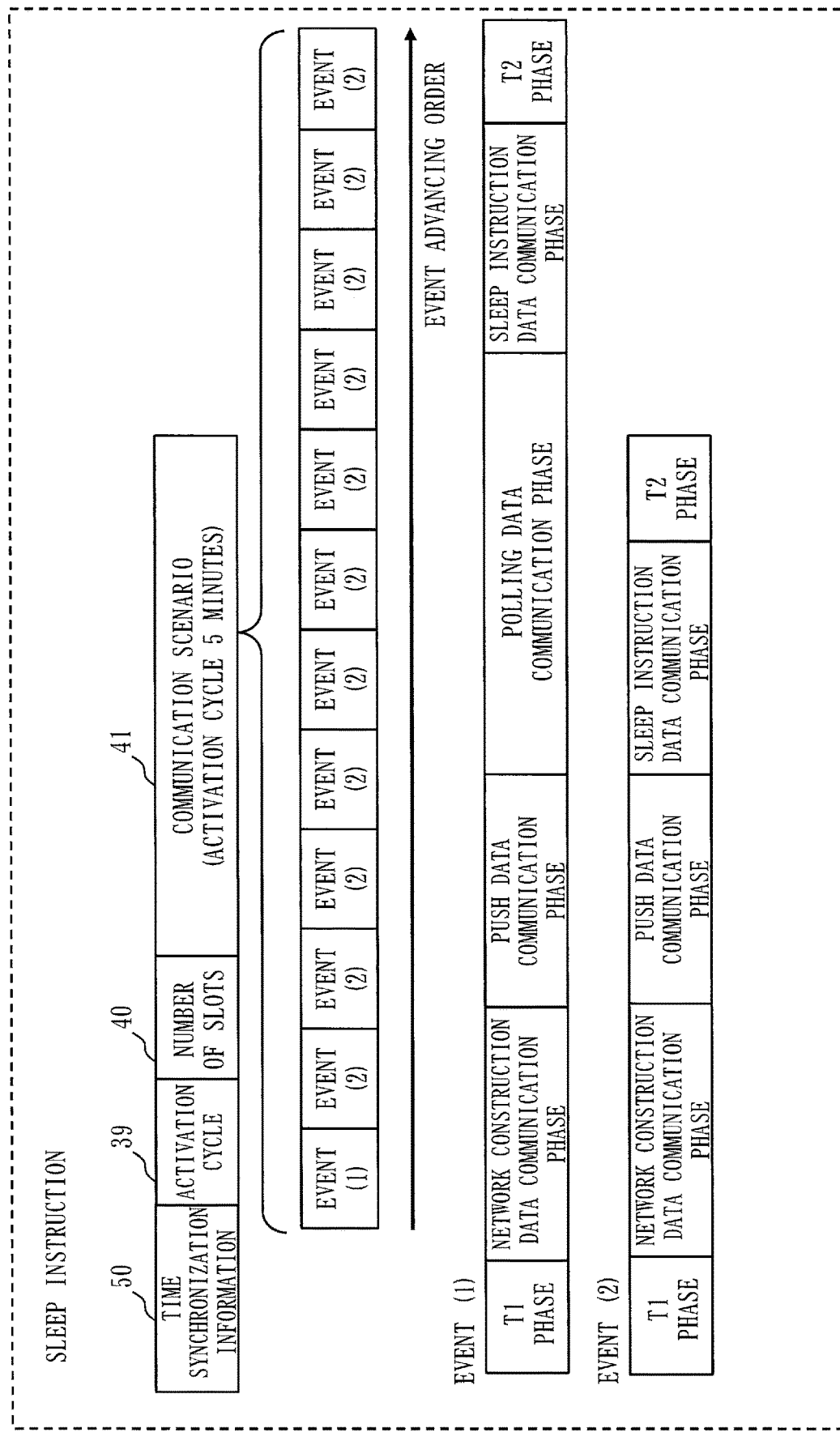
FIG. 27 illustrates an example of a sleep instruction according to Embodiment 2.

FIG. 27 illustrates an example of a sleep instruction.

A sleep instruction includes time synchronization information 50, an activation cycle 39, the number of slots 40, and a communication scenario 41.

The time synchronization information 50 shows the predicted reception time t_recv described in FIG. 9. Though the time synchronization information 50 is disposed before the activation cycle 39, the number of slots 40, and the communication scenario 41 in FIG. 27, the time synchronization information 50 is disposed after the activation cycle 39, the number of slots 40, and the communication scenario 41 (tail of the PDU) when time synchronization is performed according to the method illustrated in FIG. 9.

The activation cycle 39 is a cycle in which the master station device 1 and the slave station devices 2 to 12 are activated from the sleep.

In the example of FIG. 27, the activation cycle is five minutes. That is, each time slot is five minutes in the example of FIG. 27.

The number of slots 40 is the number of pieces of time slots included in the communication scenario 41. "12" is prescribed as the number of slots 40 in the example of FIG. 27.

In the communication scenario 41, data communication phases to be executed among the master station device 1 and the slave station devices 2 to 12 are defined.

Specifically, the event (1) is defined in the first time slot and the event (2) is defined in the other eleven pieces of time slots.

In the event (1), the T1 phase 31, the network construction data communication phase 32, the push data communication phase 33, the polling data communication phase 34, the sleep instruction data communication phase 35, and the T2 phase 36 are executed in this order.

In the event (2), the T1 phase 31, the network construction data communication phase 32, the push data communication phase 33, the sleep instruction data communication phase 35, and the T2 phase 36 are executed in this order.

The sleep instruction illustrated in FIG. 27 is generated by the sleep activation control unit 20. More specifically, the time management unit 21 outputs the time synchronization information 50 and the activation cycle 39 to the sleep activation control unit 20 and the communication scenario management unit 19 outputs the communication scenario 41 and the number of slots 40 to the sleep activation control unit 20. Then, the sleep activation control unit 20 generates a sleep instruction based on the time synchronization information 50, the activation cycle 39, the communication scenario 41, and the number of slots 40.

When the slave station devices 2 to 12 receive the sleep instruction, the communication scenario management unit 28 manages the communication scenario 41 and the number of slots 40.

Description of Advantageous Effects of Embodiment

The present embodiment provides an example of a format at a time of distribution, which is for the master station device and the slave station device to share a communication scenario with a communication destination device.

Further, in the present embodiment, when the master station device and the slave station device cancel the sleep state in every time slot, the master station device and the slave station device execute data communication phases described in the communication scenario in an execution order described in the communication scenario. Therefore, according to the present embodiment, the master station device and the slave station device can integrally perform data communication in the same schedule and can efficiently perform sleep control as is the case with Embodiment 1.

Here, when any of station devices is not driven by batteries (driven by commercial power source, for example), this station device does not need to shift to the sleep mode even at timing when the station device is supposed to shift to the sleep mode.

If the multi-hop wireless network includes a station device driven by batteries, the station device driven by batteries shifts to the sleep mode through the above-described procedure and thus power saving is achieved also as is the case with Embodiment 1.

Embodiment 3

In the present embodiment, an example in which the master station device 1 and the slave station device 200 switch communication scenarios in collaboration with each other.

In the present embodiment as well, the master station device 1 and all of the slave station devices 2 to 12 participating in the multi-hop wireless network repeat sleep and activation in synchronization with time of the master station device 1 in accordance with an activation cycle and operation time which are based on a communication scenario which is set or distributed beforehand. However, the communication scenario which is set or distributed beforehand can be changed during operation by distributing a communication scenario illustrated in FIG. 13 from the master station device 1 to all of the slave station devices 2 to 12 during operation.

Here, the multi-hop wireless network in the present embodiment is the same as the one illustrated in FIG. 1.

Further, the functional configuration example of the master station device 1 is the same as the one illustrated in FIG. 2 and the hardware configuration example of the master station device 1 is the same as the one illustrated in FIG. 25 in the present embodiment.

Furthermore, the functional configuration example of the slave station device 200 is the same as the one illustrated in FIG. 3 and the hardware configuration example of the slave station device 200 is the same as the one illustrated in FIG. 26 in the present embodiment.

The difference from Embodiment 1 is mainly described below. Matters which are not described below are the same as those of Embodiment 1.

Figure 13:
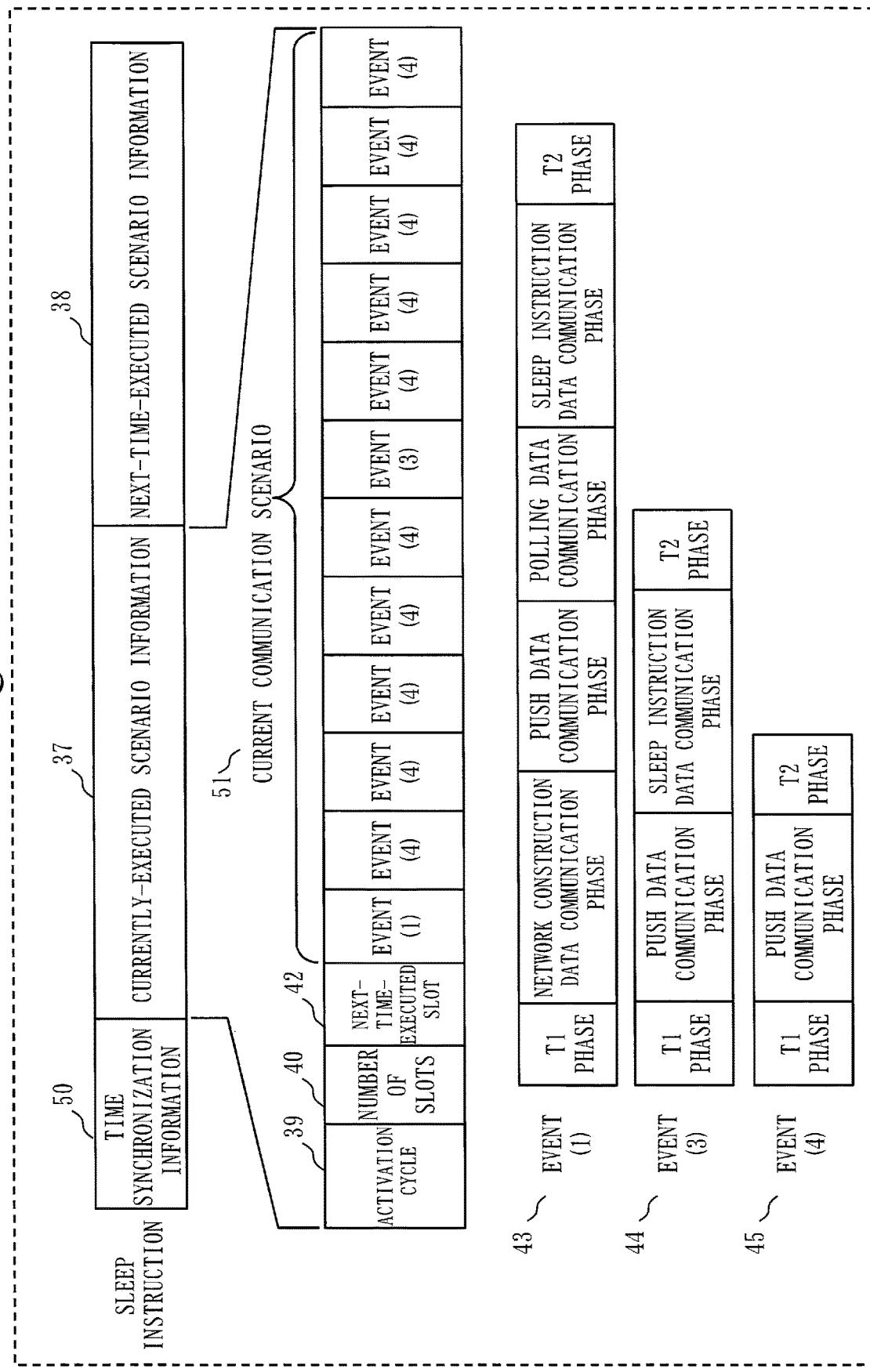
FIG. 13 illustrates an example of a sleep instruction according to Embodiment 3.

FIG. 13 illustrates an example of a sleep instruction according to the present embodiment.

In FIG. 13, the time synchronization information 50 is the same as that illustrated in FIG. 11.

A communication scenario which is currently used among the master station device 1 and the slave station devices 2 to 12 is shown in currently-executed scenario information 37. The currently-executed scenario information 37 includes the activation cycle 39, the number of slots 40, and the communication scenario 41 which are illustrated in FIG. 27.

A communication scenario after switching is shown in next-time-executed scenario information 38. The next-time-executed scenario information 38 includes the activation cycle 39, the number of slots 40, a next-time-executed slot 42, and a communication scenario 51 of the next time as illustrated in FIG. 13.

The activation cycle 39 and the number of slots 40 are the same as those illustrated in FIG. 27. However, the number of slots 40 in FIG. 13 is the number of slots included in the communication scenario of the next time. In the example of FIG. 13 as well, the number of slots 40 is 12.

The next-time-executed slot 42 provides notification of a slot which is to be executed next time. More specifically, the next-time-executed slot 42 shows a number of event which is executed in next activation. For example, "3" is described in the next-time-executed slot 42, which represents that the current event is the second event (activation time slot (00:05:00) in FIG. 12) and the third event (activation time slot (00:10:00) in FIG. 12) of the communication scenario of the next time is executed in next-time activation. Then, the master station device 1 and the slave station devices 2 to 12 thereafter execute an event of a corresponding time slot in the communication scenario of the next time every time an activation cycle comes. Thus, the next-time-executed slot 42 provides notification of a time slot (switching timing) for switching from the current communication scenario 51 to the communication scenario of the next time.

The master station device 1 and the slave station devices 2 to 12 execute one event for one wake-up and sequentially execute enumerated events to be executed based on a communication scenario in respective wake-up. If the next-time-executed scenario information 38 is set in a sleep instruction when the master station device 1 and the slave station devices 2 to 12 execute all of set events, the master station device 1 and the slave station devices 2 to 12 execute events of a communication scenario of the next-time. If the next-time-executed scenario information 38 is not set, the master station device 1 and the slave station devices 2 to 12 execute the events of the currently-executed communication scenario again from the head. The next-time-executed scenario information 38 has the same form as that of the currently-executed scenario information 37. If the next-time-executed scenario information 38 is set in a sleep instruction and the master station device 1 and the slave station devices 2 to 12 has executed all events of the communication scenario of the next time and if a next communication scenario is distributed, the master station device 1 and the slave station devices 2 to 12 execute events described in the next communication scenario. On the other hand, if the next communication scenario is not distributed or the master station device 1 and the slave station devices 2 to 12 cannot receive the next communication scenario, the master station device 1 and the slave station devices 2 to 12 execute the communication scenario which is received previous time. Alternatively, the master station device 1 and the slave station devices 2 to 12 execute a scenario which is set or distributed beforehand.

In the example of FIG. 13, the current communication scenario 51 includes an event (1), an event (3), and an event (4).

The event (1) 43 is the same as that illustrated in FIG. 11.

In the event (3) 44, the T1 phase 31, the push data communication phase 33, the sleep instruction data communication phase 35, and the T2 phase 36 are executed in this order.

In the event (4) 45, the T1 phase 31, the push data communication phase 33, and the T2 phase 36 are executed in this order.

The event (1) 43 is executed only in the first time slot. Therefore, collection of polling data and network participation of an un-participating slave station device are executed in a relatively long cycle.

The event (3) 44 is executed only once in the middle of the communication scenario 51 of the next time. Time synchronization is performed in the middle of the communication scenario 51 because frequency of the time synchronization is not enough only with the sleep instruction data communication phase in the event (3) 44.

The event (4) 45 is executed in almost all time slots in the communication scenario 51 of the next time. Therefore, sensor data is transmitted as push data from the slave station devices 2 to 12 to the master station device 1 in real time.

If the next-time-executed scenario information 38 is set in a received sleep instruction, the slave station devices 2 to 12 execute events of the communication scenario of the next time. On the other hand, if the next-time-executed scenario information 38 is not set in a received sleep instruction, the slave station devices 2 to 12 execute the events of the communication scenario 51 which is currently executed from the head again.

Further, if the next-time-executed scenario information 38 is set in a sleep instruction and a further following communication scenario is notified by the master station device 1 before the slave station devices 2 to 12 complete execution of all the events of the communication scenario of the next time, the slave station devices 2 to 12 switch to the further following communication scenario in the middle of the communication scenario of the next time. In this case, the master station device 1 also switches to the further following communication scenario.

On the other hand, if a further following communication scenario is not notified by the master station device 1 until execution of all the events of the communication scenario of the next time is completed, the slave station devices 2 to 12 execute the communication scenario of the time again. In this case, the master station device 1 also executes the communication scenario of the next time again. Alternatively, the slave station devices 2 to 12 may execute the communication scenario 51 again. In this case, the master station device 1 also executes the communication scenario 51 again.

The sleep instruction illustrated in FIG. 13 is generated by the sleep activation control unit 20 in the master station device 1. More specifically, the time management unit 21 outputs the time synchronization information 50 and the activation cycle 39 to the sleep activation control unit 20 and the communication scenario management unit 19 outputs the currently-executed scenario information 37 and the next-time-executed scenario information 38 to the sleep activation control unit 20. Then, the sleep activation control unit 20 generates a sleep instruction based on the time synchronization information 50, the activation cycle 39, the currently-executed scenario information 37, and the next-time-executed scenario information 38.

Further, switching to the communication scenario 51 of the next time is performed by the communication scenario management unit 19 in the master station device 1 and is performed by the communication scenario management unit 28 in the slave station device 200.

In Embodiments 1 and 2 and the present embodiment, it is assumed that the master station device 1 transmits a polling request to all of the slave station devices 2 to 12 in the polling data communication phase 34. However, the master station device 1 may transmit a polling request to part of the slave station devices and may receive polling data from the part of the slave station devices. In this case, time for the polling data communication phase 34 can be shortened.

Specifically, the master station device 1 divides the slave station devices 2 to 12 into a plurality of communication groups, transmits a polling request in a unit of the communication group, and collects polling data in a unit of the communication group as described below. In this case, only slave station devices belonging to a communication group which is an object of the polling request are activated and slave station devices belonging to other communication groups maintain the sleep state thereof.

The communication scenario management unit 19 of the master station device 1 manages communication scenarios for respective communication groups and shares the communication scenarios for respective communication groups with the slave station devices 200 in a unit of the communication group. Then, the data communication procedure execution unit 101 of the master station device 1 executes one or more data communication procedure/procedures described in a corresponding communication scenario in an execution order described in the corresponding communication scenario for every communication group in every time slot.

Further, the communication scenario management unit 28 of the slave station device 200 manages a communication scenario provided for a belonging communication group to which this slave station device 200 belongs, among a plurality of communication scenarios provided for respective communication groups, as a belonging communication scenario and the communication scenario management unit 28 shares the belonging communication scenario with the master station device 1. Then, the data communication procedure execution unit 201 of the slave station device 200 executes one or more data communication procedure/procedures described in the belonging communication scenario in an execution order described in the belonging communication scenario in every time slot.

Figure 14:
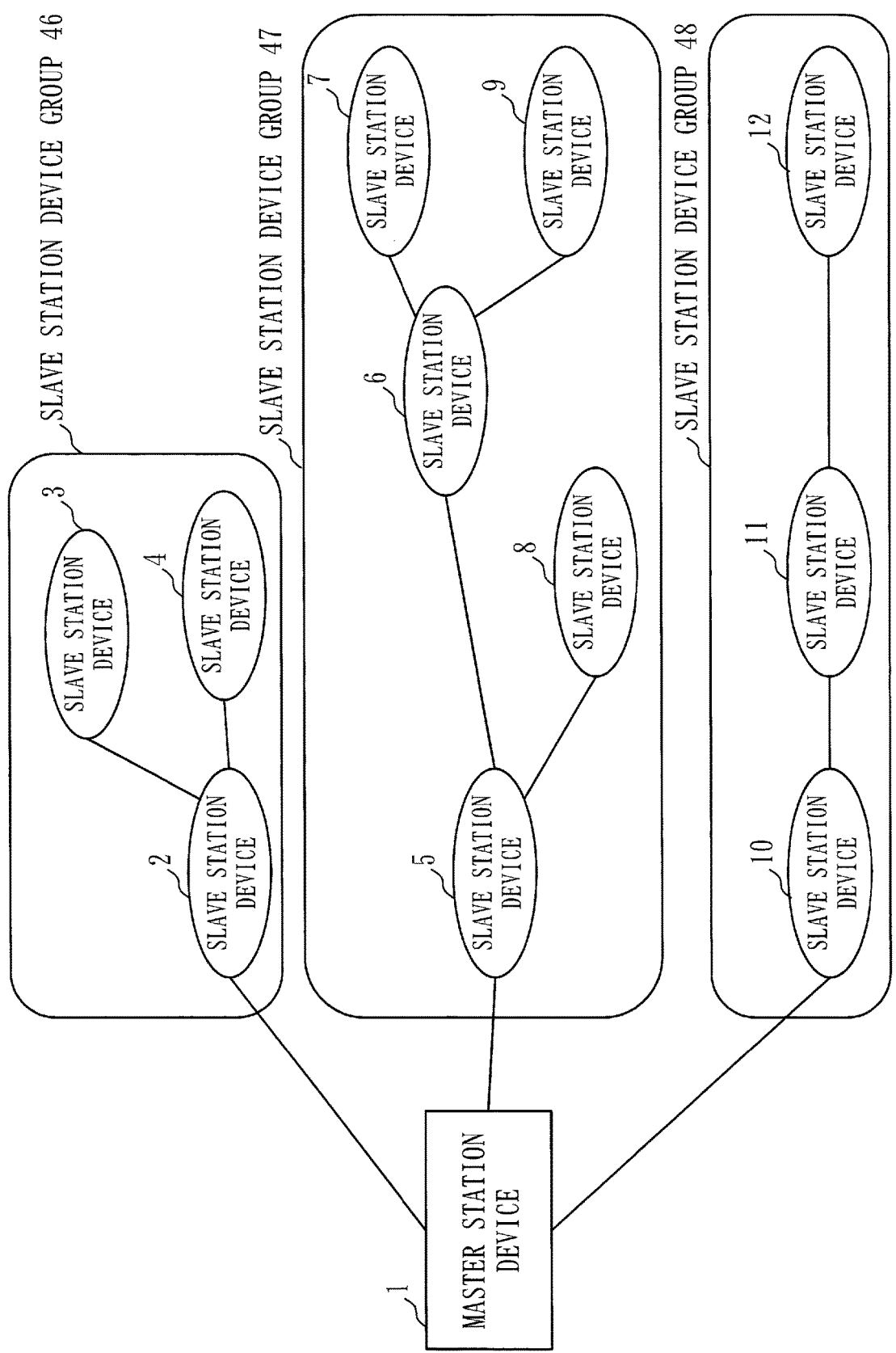
FIG. 14 illustrates an example of groups of slave station devices according to Embodiment 3.

FIG. 14 illustrates an example of communication groups of slave station devices in the multi-hop wireless network of FIG. 1.

In FIG. 14, the network construction management unit 23 of the master station device 1 divides the slave station devices 2 to 12 into a slave station device group 46, a slave station device group 47, and a slave station device group 48.

For example, in the first polling data communication phase 34, only the slave station devices 2 to 4 belonging to the slave station device group 46 are activated and the slave station devices belonging to the slave station device group 47 and the slave station device group 48 maintain the sleep state thereof. Then, the master station device 1 transmits a polling request to the slave station devices 2 to 4 and collects polling data from the slave station devices 2 to 4. When the master station device 1 completes the polling with respect to the slave station devices 2 to 4, all of the slave station devices 2 to 4 shift to the sleep state.

Then, in the following polling data communication phase 34, the slave station devices 5 to 9 belonging to the slave station device group 47 are activated and the slave station devices belonging to the slave station device group 46 and the slave station device group 48 maintain the sleep state thereof.

Only the slave station devices belonging to the group which is a polling object are activated and the master station device 1 transmits a polling request only to the slave station devices belonging to the group which is the polling object for every polling data communication phase 34 thereafter.

Further, in the polling data communication phase 34, only a station device which transmits a polling request, a station device which receives the polling request, a station device which relays the polling request, a station device which transmits polling data, a station device which relays the polling data, and a station device which receives the polling data may be activated and other station devices may maintain the sleep state thereof.

FIG. 15 to FIG. 20 illustrate specific examples.

Figure 15:
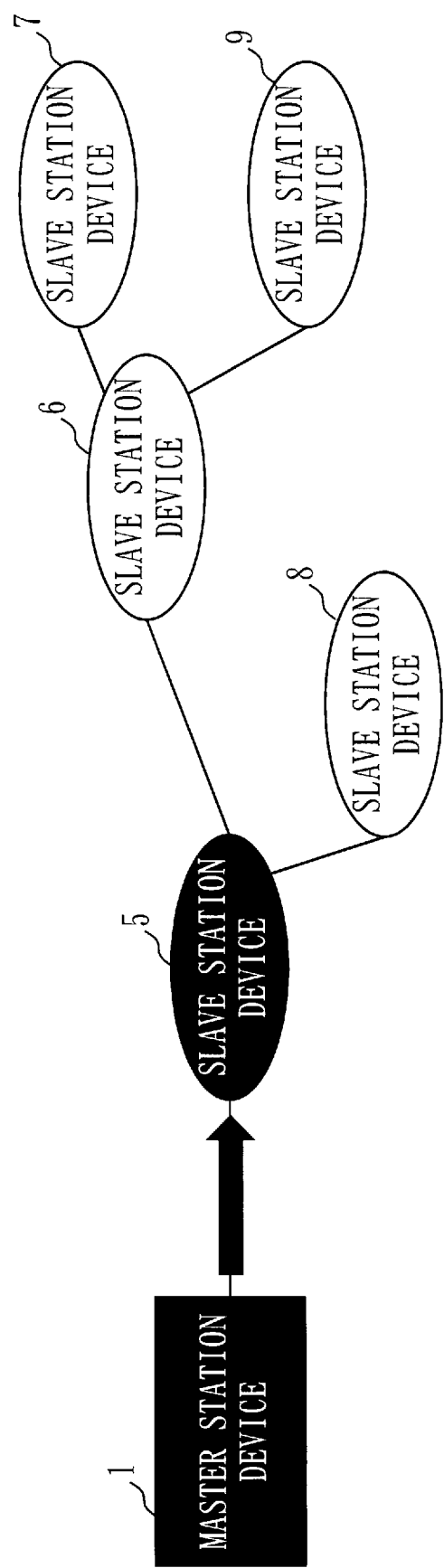
FIG. 15 illustrates an example in which only part of slave station devices shifts to the operation mode according to Embodiment 3.
Figure 16:
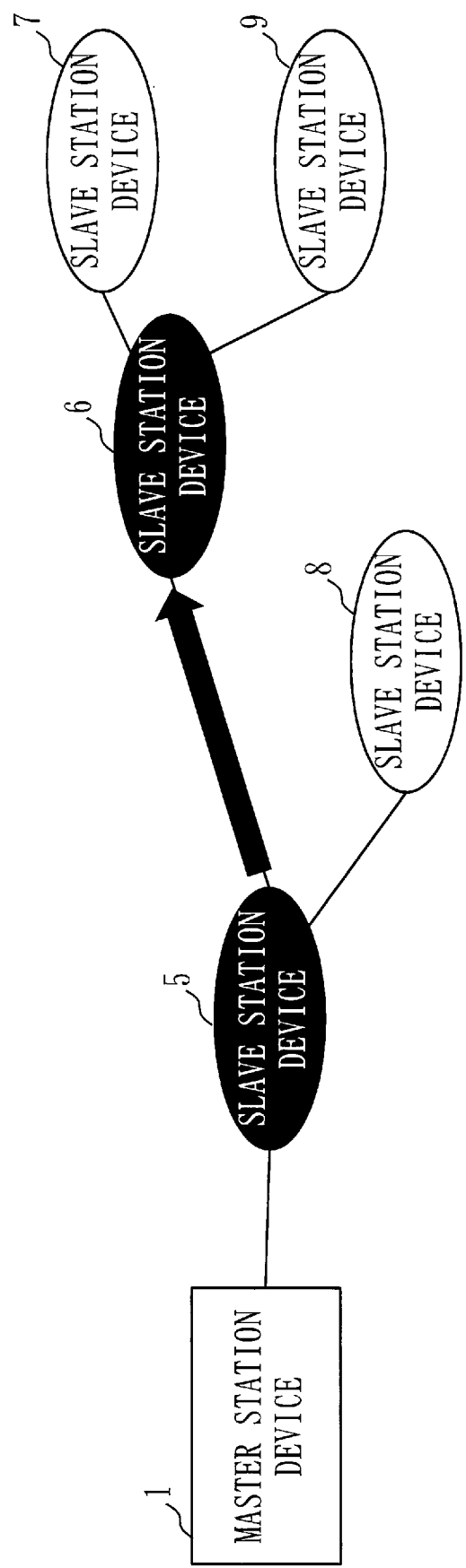
FIG. 16 illustrates an example in which only part of the slave station devices shifts to the operation mode according to Embodiment 3.
Figure 17:
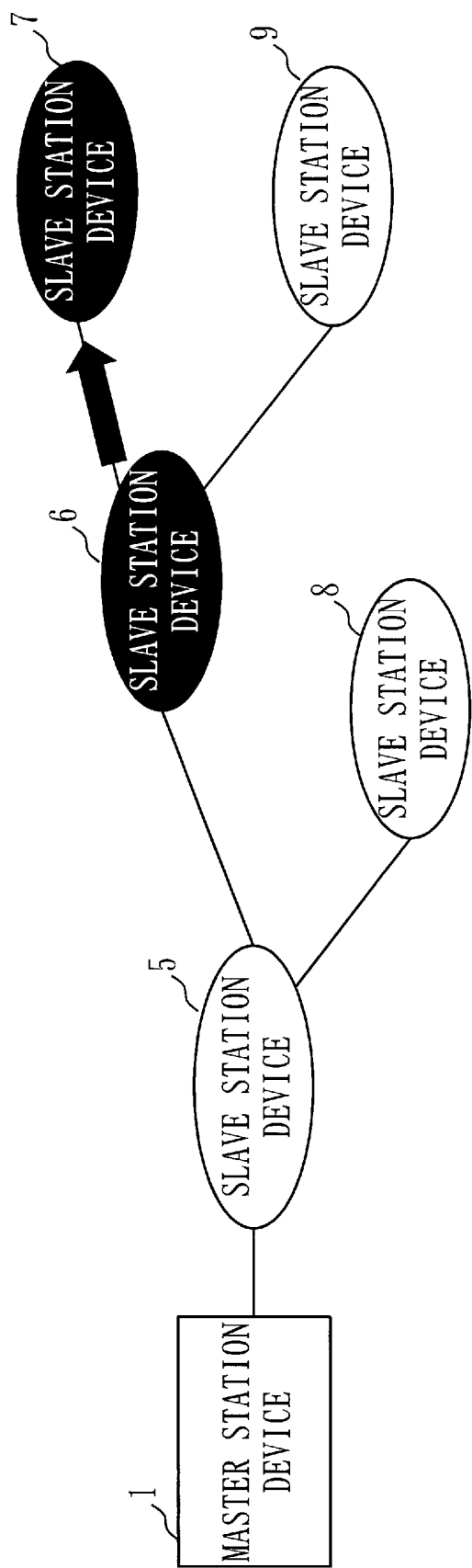
FIG. 17 illustrates an example in which only part of the slave station devices shifts to the operation mode according to Embodiment 3.

FIG. 15 to FIG. 17 illustrate transmission of a polling request from the master station device 1 to the slave station device 7.

Here, activated station devices are expressed in white letters on a black background in FIG. 15 to FIG. 17.

In FIG. 15, only the master station device 1 and the slave station device 5 which relays a polling request from the master station device 1 are activated and other slave station devices maintain the sleep state thereof. The slave station device 5 receives the polling request from the master station device 1.

In FIG. 16, the slave station device 6 is activated. The slave station device 5 transmits the polling request to the slave station device 6. The slave station device 6 receives the polling request. In FIG. 16, the master station device 1 and other slave station devices are in the sleep state.

In FIG. 17, the slave station device 7 is activated. The slave station device 6 transmits the polling request to the slave station device 7. The slave station device 7 receives the polling request. In FIG. 17, the master station device 1 and other slave station devices are in the sleep state.

Figure 18:
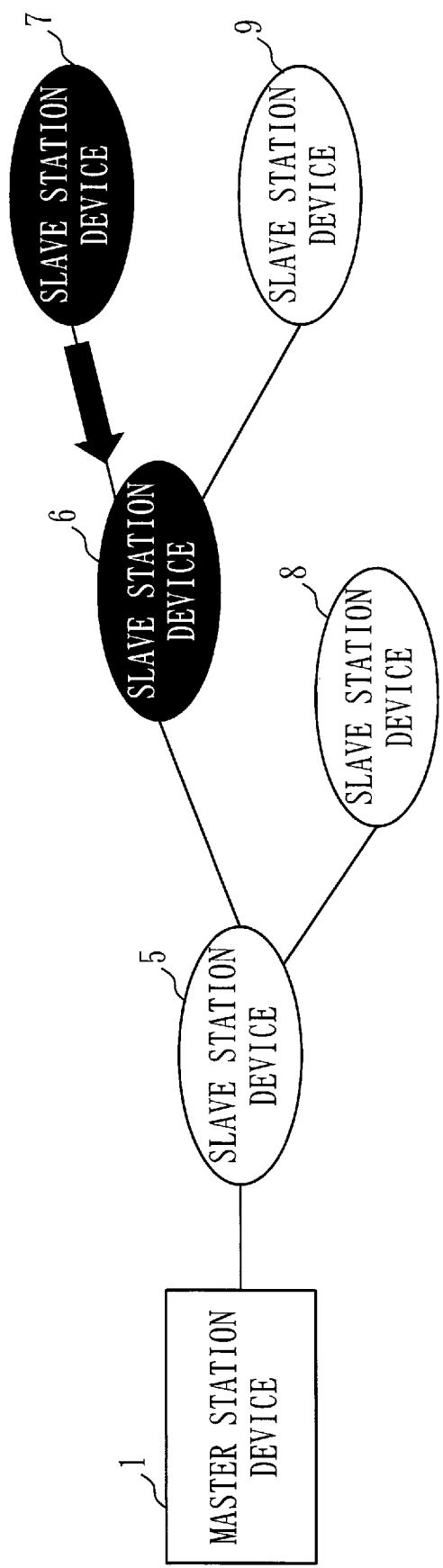
FIG. 18 illustrates an example in which only part of the slave station devices shifts to the operation mode according to Embodiment 3.
Figure 19:
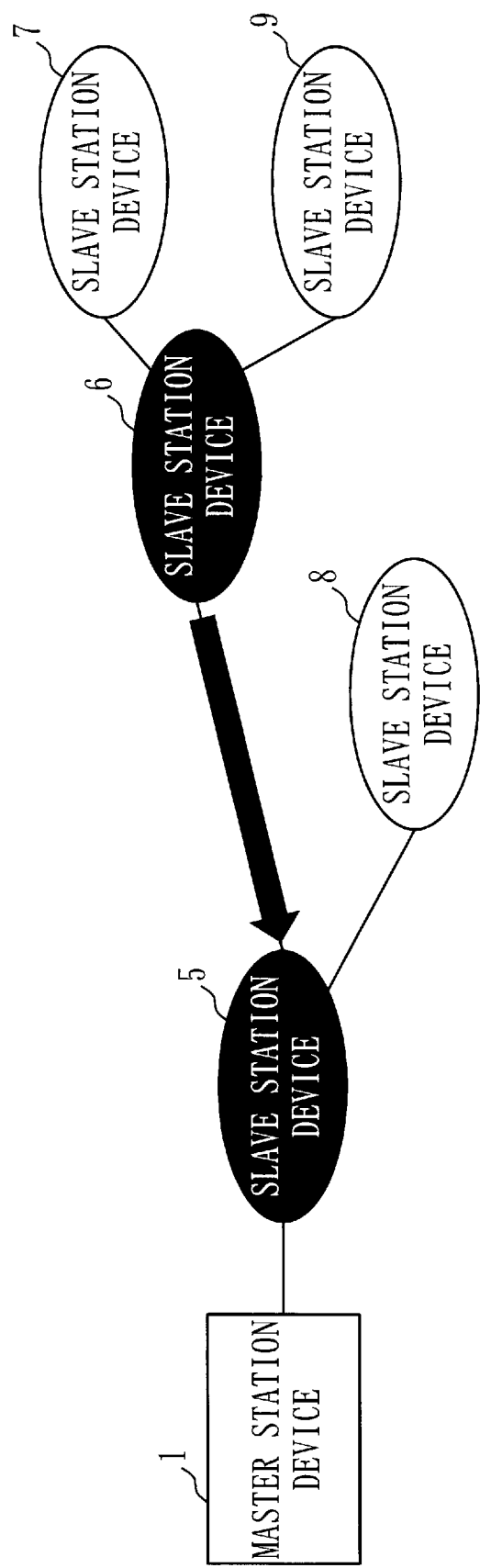
FIG. 19 illustrates an example in which only part of the slave station devices shifts to the operation mode according to Embodiment 3.
Figure 20:
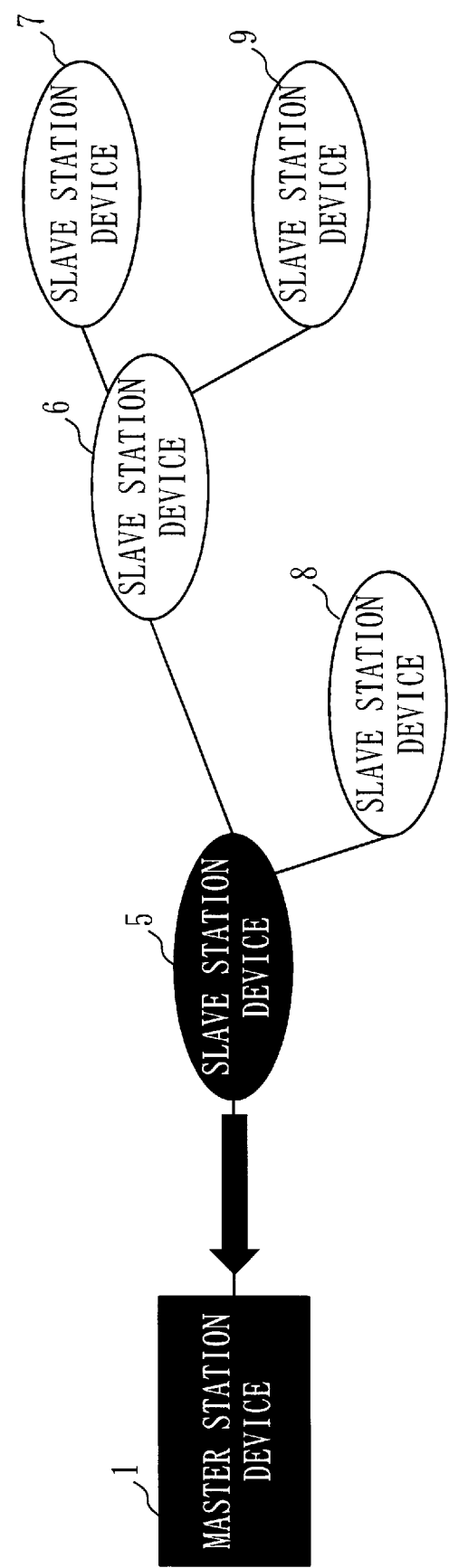
FIG. 20 illustrates an example in which only part of the slave station devices shifts to the operation mode according to Embodiment 3.

FIG. 18 to FIG. 20 illustrate transmission of polling data from the slave station device 7 to the master station device 1.

Here, activated station devices are expressed in white letters on a black background in FIG. 18 to FIG. 20.

In FIG. 18, only the slave station device 7 and the slave station device 6 which relays polling data from the slave station device 7 to the master station device 1 are activated and other slave station devices maintain the sleep state thereof. The slave station device 7 transmits the polling data to the slave station device 6 and the slave station device 6 receives the polling data from the slave station device 7.

In FIG. 19, the slave station device 5 is activated. The slave station device 6 transmits the polling data to the slave station device 5. The slave station device 5 receives the polling data. In FIG. 19, the master station device 1 and other slave station devices are in the sleep state.

In FIG. 20, the master station device 1 is activated. The slave station device 5 transmits the polling data to the master station device 1. The master station device 1 receives the polling data. In FIG. 20, other slave station devices are in the sleep state.

In the push data communication phase 33 as well, the slave station devices 2 to 12 may be divided into a plurality of communication groups and push data may be transmitted in a unit of the communication group. In this case, only slave station devices belonging to a communication group which is a transmission object of the push data are activated and slave station devices belonging to other communication groups maintain the sleep state thereof.

The grouping can be performed as illustrated in FIG. 14, for example, for the transmission of push data as well.

Further, in the push data communication phase 33 as well, only station devices that perform transmission of push data, relay of the push data, and reception of the push data may be activated and other station devices may maintain the sleep state thereof as illustrated in FIG. 18 to FIG. 20.

Figure 21:
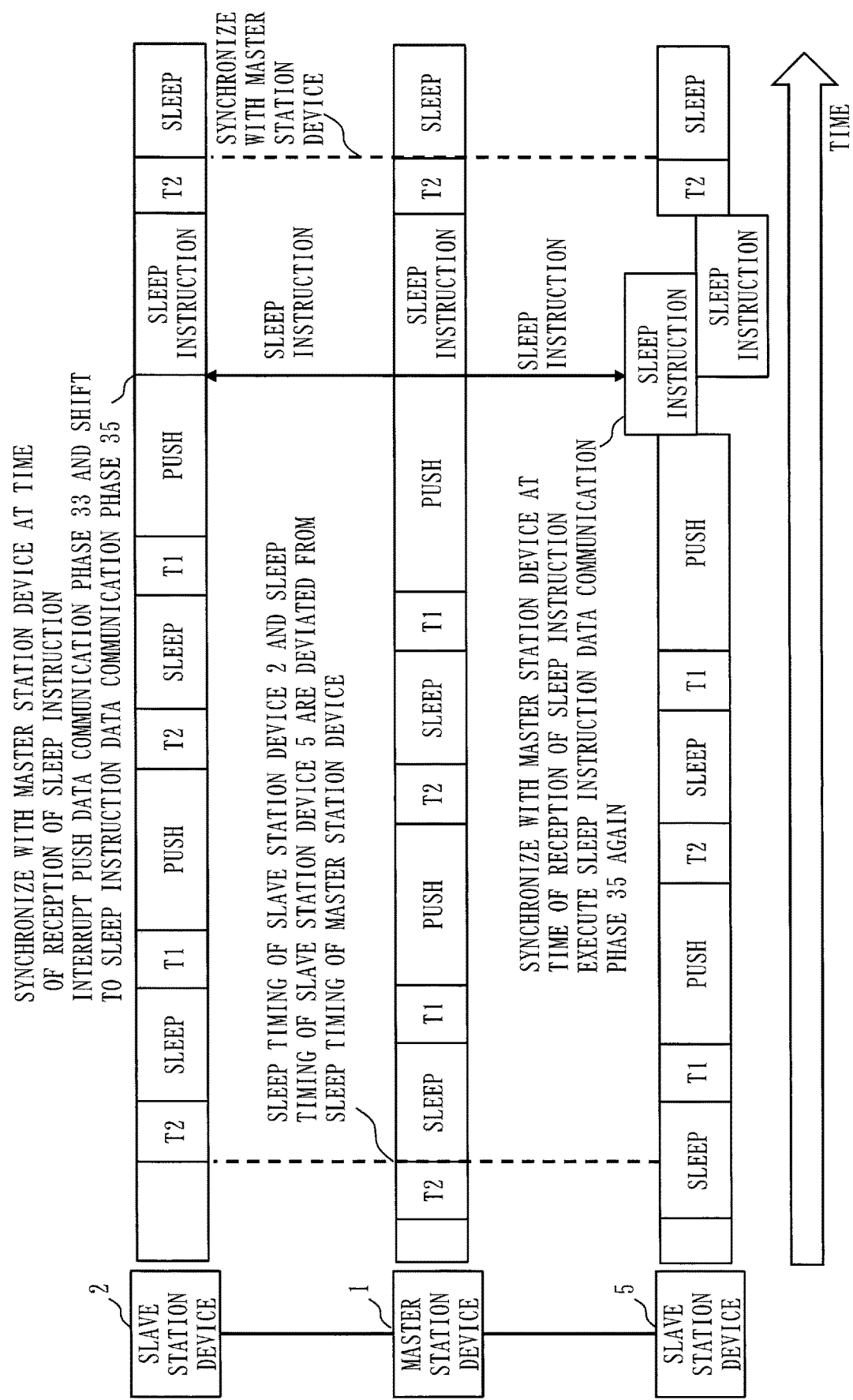
FIG. 21 illustrates a procedure which is performed in a case where synchronization between the master station device and the slave station device is deviated according to Embodiment 3.

FIG. 21 illustrates an operation for the case where time synchronization with the master station device 1 is deviated in the slave station device due to some causes.

In FIG. 21, it is assumed that time of the slave station device 2 is delayed from that of the master station device 1 and time of the slave station device 5 is advanced from that of the master station device 1.

Since time of the slave station device 2 is delayed from that of the master station device 1, the slave station device 2 receives a sleep instruction in the push data communication phase 33. Time synchronization with the master station device 1 is restored at the time when the slave station device 2 receives the sleep instruction and the slave station device 2 interrupts the push data communication phase 33 and shifts to the sleep instruction data communication phase 35.

Since time of the slave station device 5 is advanced from that of the master station device 1, the sleep instruction data communication phase 35 ends earlier than the master station device 1 by the amount of the synchronization deviation. Time synchronization with the master station device 1 is restored at the time when the slave station device 5 receives a sleep instruction, and the slave station device 5 executes the sleep instruction data communication phase 35 until the correct end timing which is synchronized with the master station device 1.

Figure 22:
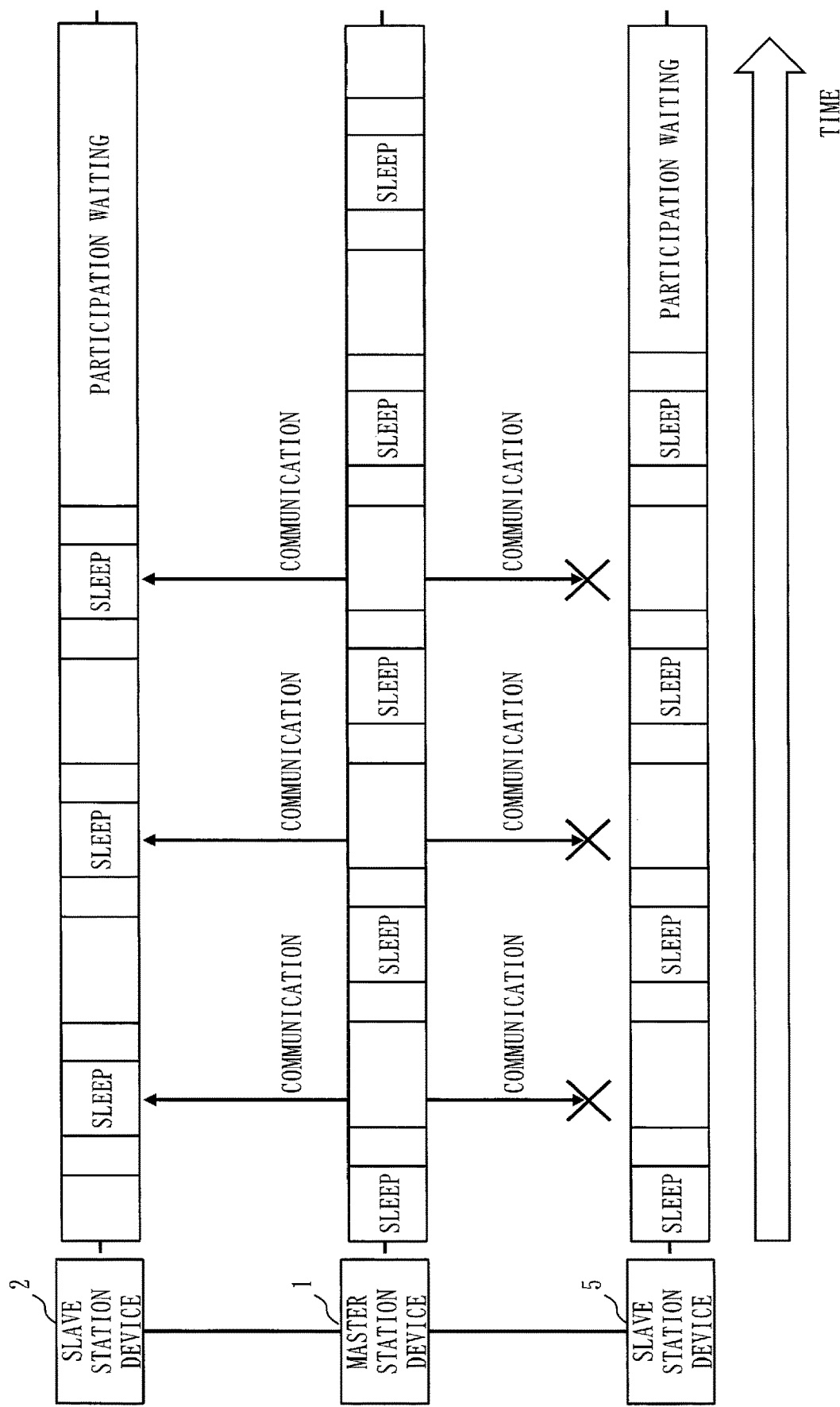
FIG. 22 illustrates a procedure which is performed in the case where synchronization between the master station device and the slave station device is deviated according to Embodiment 3.

FIG. 22 illustrates an operation of the slave station device 2 whose time synchronization with the master station device 1 is largely deviated and an operation of the slave station device 5 at which communication from the master station device 1 does not arrive.

The slave station device 2 is largely deviated in time synchronization with the master station device 1 and the slave station device 2 sleeps in a period in which the master station device 1 makes communication. When any communication from the master station device 1 does not arrive at the slave station device 2 for a certain period of time, the slave station device 2 returns to the participation waiting state and executes the participation sequence of FIG. 10.

When any communication from the master station device 1 does not arrive at the slave station device 5, the slave station device 5 returns to the participation waiting state and executes the participation sequence of FIG. 10 because any communication from the master station device 1 does not arrive for a certain period of time, as is the case with the slave station device 2.

Figure 23:
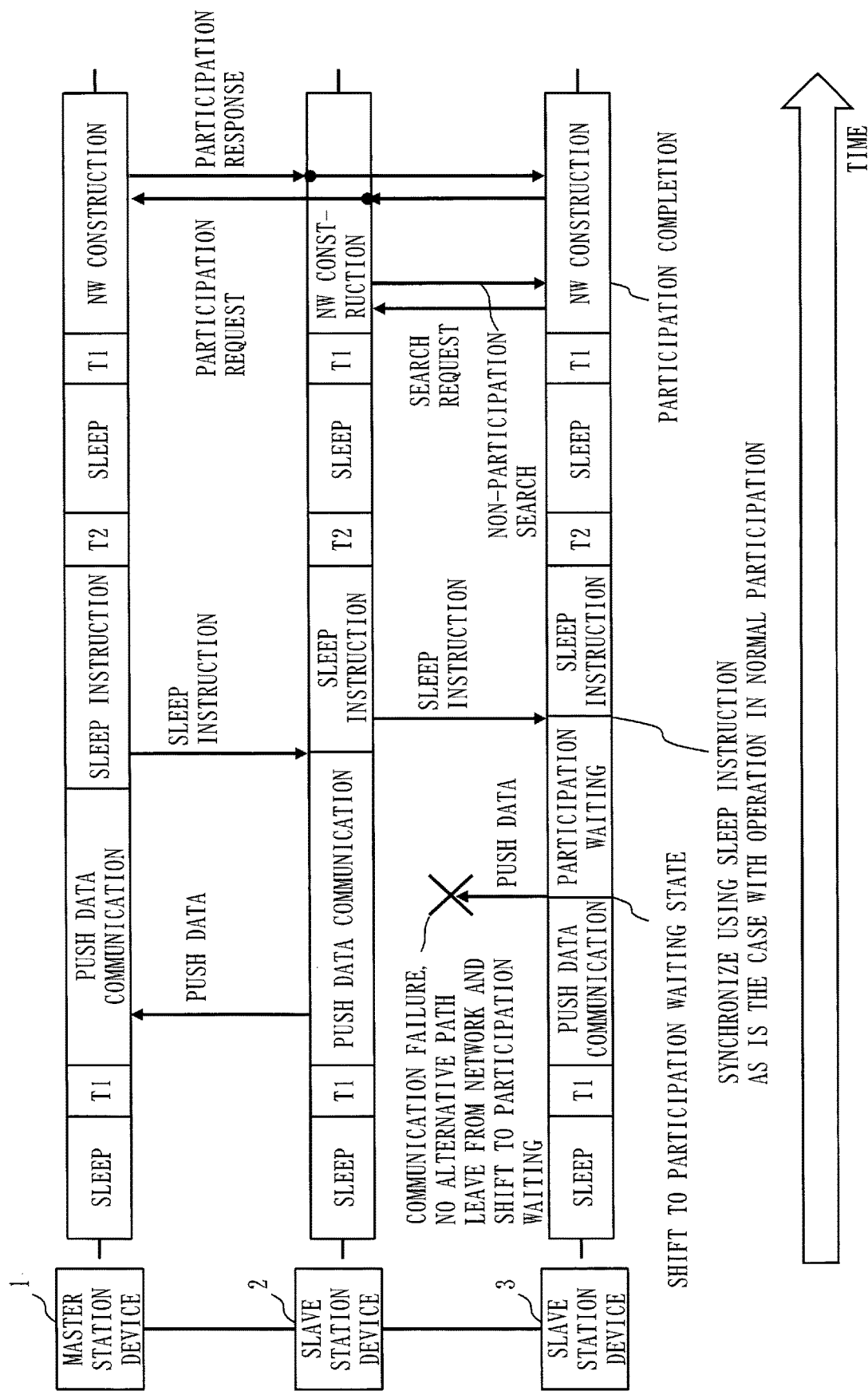
FIG. 23 illustrates a procedure which is performed in a case where a transmission error occurs according to Embodiment 3.

FIG. 23 illustrates an operation for leaving from a network due to communication abnormality and re-participating in the network.

The slave station device 3 transmits push data to the slave station device 2 positioned upstream on the path, but a transmission error occurs. The slave station device 3 leaves from the multi-hop wireless network due to the transmission error, and shifts to the participation waiting state. Here, the slave station device 3 can try retransmission of the data or transmission in an alternative path before determining the transmission error. The slave station device 3 in the participation waiting state performs the participation sequence of FIG. 10 and participates in the multi-hop wireless network at the time when communication becomes possible.

Figure 24:
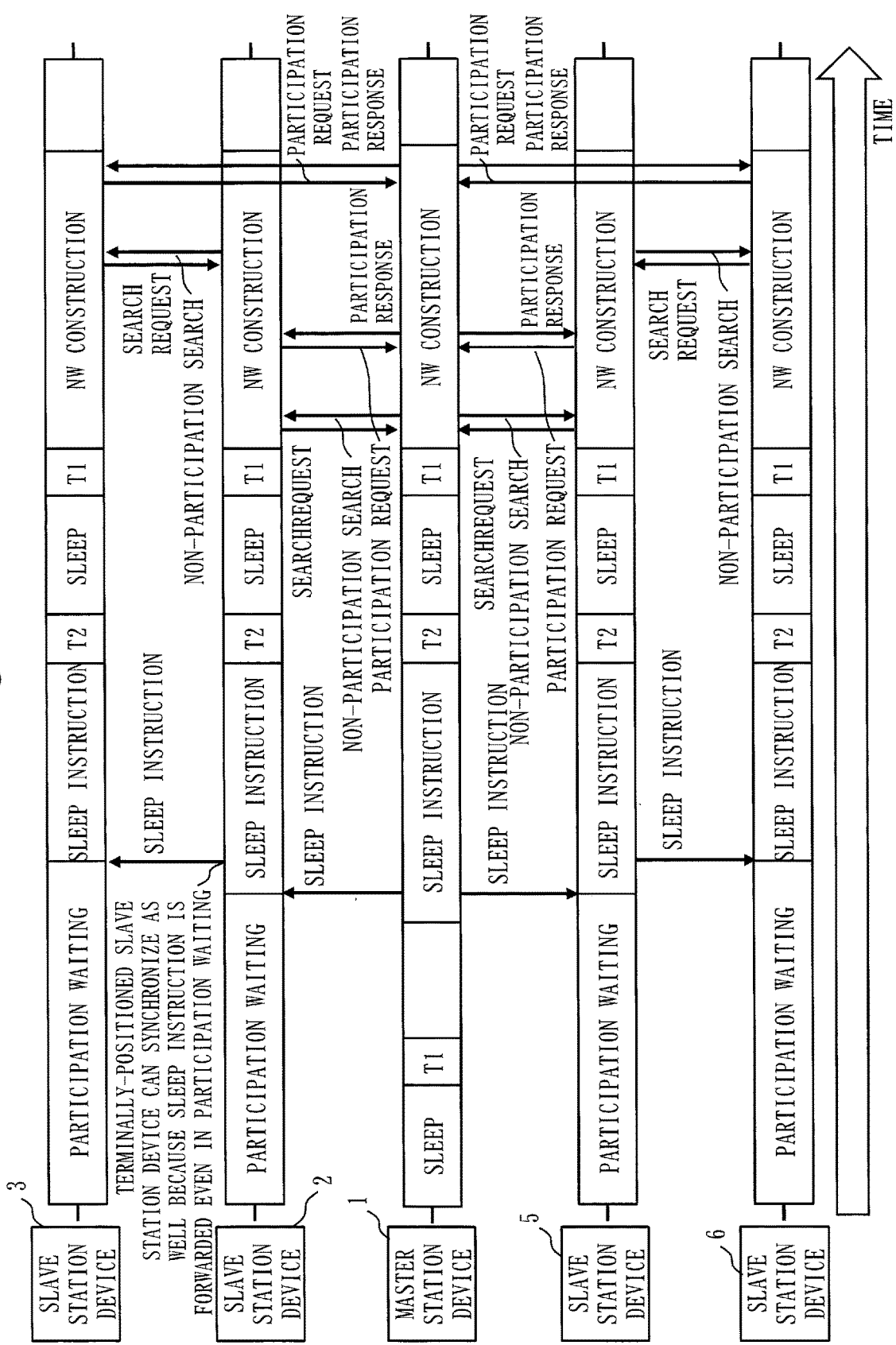
FIG. 24 illustrates a procedure which is performed when the master station device and a plurality of slave station devices simultaneously are activated according to Embodiment 3.

FIG. 24 illustrates an operation for the case where the master station device 1, the slave station device 2, the slave station device 3, the slave station device 5, and the slave station device 6 are simultaneously activated.

The master station device 1 starts an operation following a communication scenario after the activation thereof. The slave station device 2, the slave station device 3, the slave station device 5, and the slave station device 6 shift to the participation waiting state after activation thereof.

The master station device 1 transmits a sleep instruction to the slave station device 2 and the slave station device 5.

The slave station device 2 and the slave station device 5 receive the sleep instruction from the master station device 1 in the participation waiting state, perform time synchronization with the master station device 1, and acquire the communication scenario.

The slave station device 2 forwards the sleep instruction from the master station device 1 to the slave station device 3. Further, the slave station device 5 forwards the sleep instruction from the master station device 1 to the slave station device 6.

Each of the slave station device 3 and the slave station device 6 receives the sleep instruction, performs time synchronization in a similar manner to the slave station device 2 and the slave station device 5, and acquires the communication scenario.

Since the time synchronization is performed, the master station device 1, the slave station device 2, the slave station device 3, the slave station device 5, and the slave station device 6 simultaneously perform sleep and activation. The participation sequence of FIG. 10 is performed thereafter.

While the embodiments of the present invention have been described in the foregoing, two or more of these embodiments may be combined and implemented.

Alternatively, one of these embodiments may be partially implemented.

Alternatively, two or more of these embodiments may be partially combined and implemented.

Note that the present invention is not limited to these embodiments and can be variously modified as required.

Description of Hardware Configuration

Finally, supplemental description of the hardware configurations of the master station device 1 and the slave station device 200 is made.

The processor 901 and the processor 911 are ICs (Integrated Circuits) which perform processing.

The processor 901 and the processor 911 are each a CPU (Central Processing Unit), DSP (Digital Signal Processor), or the like.

The storage device 902 and the storage device 912 are each a RAM (Random Access Memory), ROM (Read Only Memory), flash memory, HDD (Hard Disk Drive), or the like.

The communication interface 903 and the communication interface 913 each include a receiver which receives data and a transmitter which transmits data.

The communication interface 903 and the communication interface 913 are each, for example, a communication chip or NIC (Network Interface Card).

An OS (Operating System) is also stored in the storage device 902.

And, at least part of the OS is executed by the processor 901.

While executing at least part of the OS, the processor 901 executes programs for realizing the functions of the data communication procedure execution unit 101 and the communication scenario management unit 19.

With the processor 901 executing the OS, task management, memory management, file management, communication control, and so forth are performed.

An OS is also stored in the storage device 912.

And, at least part of the OS is executed by the processor 911.

While executing at least part of the OS, the processor 911 executes programs for realizing the functions of the data communication procedure execution unit 201 and the communication scenario management unit 28.

With the processor 911 executing the OS, task management, memory management, file management, communication control, and so forth are performed.

Also, information, data, a signal value, and a variable value indicating the results of processes by the data communication procedure execution unit 101 and the communication scenario management unit 19 are stored in at least any of the storage device 902 and a register and a cache memory in the processor 901.

Also, the programs for realizing the functions of the data communication procedure execution unit 101 and the communication scenario management unit 19 may be stored in a portable storage medium such as a magnetic disk, flexible disk, optical disk, compact disk, Blu-ray (a registered trademark) disk, or DVD.

Similarly, information, data, a signal value, and a variable value indicating the results of processes by the data communication procedure execution unit 201 and the communication scenario management unit 28 are stored in at least any of the storage device 912 and a register and a cache memory in the processor 911.

Also, the programs for realizing the functions of the data communication procedure execution unit 201 and the communication scenario management unit 28 may be stored in a portable storage medium such as a magnetic disk, flexible disk, optical disk, compact disk, Blu-ray (a registered trademark) disk, or DVD.

Also, the "unit" in each of the data communication procedure execution unit 101, the communication scenario management unit 19, the data communication procedure execution unit 201, and the communication scenario management unit 28 may be read as the "circuit", the "step", the "procedure", or the "process".

Also, the master station device 1 and the slave station device 200 may be realized by an electronic circuit such as a logic IC (Integrated Circuit), GA (Gate Array), ASIC (Application Specific Integrated Circuit), or FPGA (Field-Programmable Gate Array).

Note that the processor and the above electronic circuit are also collectively referred to as processing circuitry.

REFERENCE SIGNS LIST

1: master station device; 2: slave station device; 3: slave station device; 4: slave station device; 5: slave station device; 6: slave station device; 7: slave station device; 8: slave station device; 9: slave station device; 10: slave station device; 11: slave station device; 12: slave station device; 13: wireless communication unit; 14: network construction management unit; 15: push data collection unit; 16: polling control unit; 17: polling data collection unit; 18: sensor data collection database unit; 19: communication scenario management unit; 20: sleep activation control unit; 21: time management unit; 22: wireless communication unit; 23: network construction management unit; 24: sensor unit; 25: push data transmission unit; 26: polling data transmission unit; 27: polling response unit; 28: communication scenario management unit; 29: sleep activation control unit; 30: time management unit; 31: T1 phase; 32: network construction data communication phase; 33: push data communication phase; 34: polling data communication phase; 35: sleep instruction data communication phase; 36: T2 phase; 101: data communication procedure execution unit; 200: slave station device; 201: data communication procedure execution unit

The invention claimed is:

1. A communication device that switches a sleep state and an operation state in synchronization with a communication destination device, the communication device comprising:
   processing circuitry to:
   manage a communication scenario in which one or more data communication procedures among a data communication procedure for data communication by polling, a data communication procedure for push data communication, a data communication procedure for participation in a communication network, and a data communication procedure for shift to the sleep state are described as an execution data communication procedure that is to be executed in the operation state, and an execution order of the one or more execution data communication procedures is further described, and which is shared with the communication destination device; and
   execute the one or more execution data communication procedures described in the communication scenario with the communication destination device in the execution order described in the communication scenario, after the sleep state is switched to the operation state and after a first limitation period in which only data reception is permitted elapses, and shift to the sleep state, after all of the one or more data communication procedures described in the communication scenario are executed and after a second limitation period in which only data relay is permitted elapses.

2. The communication device according to claim 1, wherein
   the processing circuitry manages a communication scenario in which an event, in which one or more execution data communication procedures and an execution order of the one or more execution data communication procedures are defined, is described for every switching cycle from the sleep state to the operation state, and
   executes in every switching cycle, one or more execution data communication procedures defined in a corresponding event in an execution order defined in the corresponding event, with the communication destination device.

3. The communication device according to claim 1, wherein
   the processing circuitry may switch the communication scenario in coalition with the communication destination device, and
   the processing circuitry executes, when the communication scenario is switched, every time the sleep state is switched to the operation state, one or more data communication procedures described in a communication scenario after switching in an execution order described in the communication scenario after switching.

4. The communication device according to claim 3, wherein
   the processing circuitry notifies the communication destination device of switching timing of the communication scenario so as to cause the communication destination device to switch the communication scenario at the switching timing, and switches the communication scenario at the switching timing.

5. The communication device according to claim 3, wherein
the processing circuitry is notified of switching timing of the communication scenario by the communication destination device and switches the communication scenario at the switching timing which is notified by the communication destination device.

6. The communication device according to claim 1, wherein
the processing circuitry executes, every time the sleep state is switched to the operation state after time synchronization with the communication destination device is performed, the one or more data communication procedures described in the communication scenario in the execution order described in the communication scenario, with the communication destination device.

7. The communication device according to claim 6, wherein
the processing circuitry executes the data communication procedure for shift to the sleep state, receives data used for time synchronization with the communication destination device from the communication destination device in the data communication procedure for shift to the sleep state, and performs time synchronization with the communication destination device by using the data which is received.

8. The communication device according to claim 7, wherein
the processing circuitry
receives, in the data communication procedure for shift to the sleep state, data which is transmitted from the communication destination device and in which predicted reception time is described, the predicted reception time being time obtained by adding transmission delay time and transmission required time for the data on the transmission path, to the transmission start time, the transmission delay time being delay time from transmission start time to actual start of transmission of the data to a transmission path, the transmission start time being time at which the communication destination device has started a transmission process of the data, and measures reception delay time which is delay time from detection of completion of the reception of the data by the communication device to actual acquisition of the predicted reception time from the data, and
performs time synchronization with the communication destination device by using the predicted reception time and the reception delay time.

9. The communication device according to claim 1, wherein
the communication device is included in a communication network or a wireless mesh network in which a master station device and a plurality of slave station devices synchronously switch the sleep state and the operation state.

10. The communication device according to claim 1, wherein
the communication device is a master station device included in a communication network which includes a plurality of slave station devices as a plurality of communication destination devices, and
the processing circuitry starts the data communication procedure for shift to the sleep state earlier than prescribed start time, when the data communication procedure for shift to the sleep state is executed with the plurality of slave station devices after at least one of the data communication procedure for data communication by polling and the data communication procedure for push data communication is executed as a preceding data communication procedure with the plurality of slave station devices and the preceding data communication procedure ends earlier than prescribed end time.

11. The communication device according to claim 1, wherein
the communication device is a master station device included in a communication network which includes a plurality of slave station devices as a plurality of communication destination devices in a manner that the plurality of slave station devices are classified into a plurality of communication groups,
the processing circuitry manages communication scenarios for respective communication groups and shares with the slave station devices, the communication scenarios for respective communication groups in a unit of a communication group, and
the processing circuitry executes, every time the sleep state is switched to the operation state, one or more data communication procedures described in a corresponding communication scenario in an execution order described in the corresponding communication scenario, for every communication group.

12. The communication device according to claim 1, wherein
the communication device is a slave station device which is included in a communication network and which belongs to a communication group among a plurality of communication groups, the communication network including a master station device as a communication destination device and including a plurality of slave station devices in a manner that the plurality of slave station devices are classified into the plurality of communication groups, the plurality of slave station devices executing a data communication procedure with the master station device,
the processing circuitry manages a communication scenario being provided to a belonging communication group to which the communication device belongs, as a belonging communication scenario, among a plurality of communication scenarios provided for respective communication groups and shares the belonging communication scenario with the master station device, and
the processing circuitry executes one or more data communication procedures described in the belonging communication scenario in an execution order described in the belonging communication scenario, every time the sleep state is switched to the operation state.

13. The communication device according to claim 1, wherein
when the data communication procedure for push data communication is described in the communication scenario at a time of switching from the sleep state to the operation state after time synchronization with the communication destination device is performed, the processing circuitry increases transmission delay time depending on a number of hops from the master station device so as to avoid overlap among the slave station devices as to transmission timing of upward data communication by the push data, thereby the slave station device closest to the master station device performs data transmission first.

14. The communication device according to claim 1, wherein
 the processing circuitry is a communication device included in a communication network including a master station device and a plurality of slave station devices, and
 when the data communication procedure for data communication by polling is described in the communication scenario at a time of switching from the sleep state to the operation state after time synchronization with the communication destination device is performed, the master station device issues a polling data request to all of the slave station devices or a specific slave station device and the slave station device that receives the request returns sensor data.

15. The communication device according to claim 1, wherein
 the processing circuitry is a communication device included in a communication network including a master station device and a plurality of slave station devices, and
 when not participating in the network, a slave station device waits to receive downward data communication from the master station device as a participation waiting state after activation thereof, first performs time synchronization upon reception of the downward data communication, and then issues a participation request in network construction data communication for performing path control of the wireless mesh network so as to participate in the network.

16. The communication device according to claim 1, wherein
 the processing circuitry
  is a communication device included in a communication network including a master station device and a plurality of slave station devices, and
  sets and transmits currently-executed scenario information and next-time-executed scenario information as well as time synchronization information in the downward data communication from the master station device and thereby is able to change preset scenario.

17. A communication method comprising:
 managing, by a communication device that is a computer switching a sleep state and an operation state in synchronization with a communication destination device, a communication scenario in which one or more data communication procedures among a data communication procedure for data communication by polling, a data communication procedure for push data communication, a data communication procedure for participation in a communication network, and a data communication procedure for shift to the sleep state are described as an execution data communication procedure that is to be executed in the operation state, and an execution order of the one or more execution data communication procedures is further described, and which is shared with the communication destination device; and
 executing, by the communication device, the one or more execution data communication procedures described in the communication scenario with the communication destination device in the execution order described in the communication scenario, after the sleep state is switched to the operation state and after a first limitation period in which only data reception is permitted elapses, and shifting to the sleep state, after all of the one or more data communication procedures described in the communication scenario are executed and after a second limitation period in which only data relay is permitted elapses.

18. A non-transitory computer readable medium storing a communication program that causes a communication device that is a computer switching a sleep state and an operation state in synchronization with a communication destination device to execute:
 a communication scenario management process of managing a communication scenario in which one or more data communication procedures among a data communication procedure for data communication by polling, a data communication procedure for push data communication, a data communication procedure for participation in a communication network, and a data communication procedure for shift to the sleep state are described as an execution data communication procedure that is to be executed in the operation state, and an execution order of the one or more execution data communication procedures is further described, and which is shared with the communication destination device; and
 a data communication procedure execution process of executing the one or more execution data communication procedures described in the communication scenario with the communication destination device in the execution order described in the communication scenario, after the sleep state is switched to the operation state and after a first limitation period in which only data reception is permitted elapses, and shifting to the sleep state, after all of the one or more data communication procedures described in the communication scenario are executed and after a second limitation period in which only data relay is permitted elapses.

* * * * *